(12) United States Patent
Asai

(10) Patent No.: US 6,704,527 B2
(45) Date of Patent: Mar. 9, 2004

(54) IMAGE FORMING APPARATUS, IMAGE FORMING METHOD, MEDIUM FOR PROVIDING CONTROL PROGRAM, AND CONTROL PROGRAM

(75) Inventor: Hidehiko Asai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 10/157,847

(22) Filed: May 31, 2002

(65) Prior Publication Data

US 2002/0186983 A1 Dec. 12, 2002

(30) Foreign Application Priority Data

Jun. 6, 2001 (JP) .................................. 2001-170964
Apr. 2, 2002 (JP) .................................. 2002-100012

(51) Int. Cl.[7] .................... G03G 15/00; G03G 15/36
(52) U.S. Cl. .................... 399/82; 399/194; 399/408; 399/410
(58) Field of Search ................ 399/82, 85, 193, 399/194, 407, 408, 410

(56) References Cited

U.S. PATENT DOCUMENTS

| 5,579,419 A | | 11/1996 | Yaguchi et al. ............. 382/305 |
| 5,774,232 A | * | 6/1998 | Tabata et al. ............... 399/408 |
| 6,097,916 A | * | 8/2000 | Asai ........................... 399/407 |
| 6,115,510 A | * | 9/2000 | Koga ........................... 399/408 |

FOREIGN PATENT DOCUMENTS

JP          9-247427 A         9/1997

* cited by examiner

Primary Examiner—Fred L Braun
(74) Attorney, Agent, or Firm—Fitzpatrick, Cella, Harper & Scinto

(57) ABSTRACT

An image forming apparatus has: character data forming means for forming character data; synthesizing means for synthesizing the character data formed by the character data forming means with image data; image output means for printing a synthesis result of the synthesizing means onto a sheet; sheet post-processing means for performing a post-process to the sheet outputted by the image output means; and adjusting means for adjusting a printing position of the character data and a processing position of the sheet post-processing means.

34 Claims, 24 Drawing Sheets

FIG. 4

| Address | Content | | |
|---|---|---|---|
| 8000000H | 8 POINT DATA 0 TO 9 | | |
| 8000B40H | 9 POINT DATA 0 TO 9 | | |
| 8001680H | 10 POINT DATA 0 TO 9 | | |
| 80021C0H | 10.5 POINT DATA 0 TO 9 | | |
| 8002D00H | 0 | 1 | 12 POINT DATA 0 TO 9 |
| | 16 POINT DATA 0 TO 9 | | |
| | | | |

(POSITION IN THE CASE WHERE NUMBERING POSITION WAS CHANGED)

IMAGE FORMING APPARATUS, IMAGE FORMING METHOD, MEDIUM FOR PROVIDING CONTROL PROGRAM, AND CONTROL PROGRAM

BACKGROUND OF THE INVENTION

1. Field of the Invention

The invention relates to an image forming apparatus or the like and, more particularly, a digital image forming apparatus or the like for forming another image information so as to overlap with it.

2. Related Background Art

In recent years, in copying apparatuses, there has been proposed a digital image forming apparatus having a numbering function for adding page numbers to copied recording paper or a security printing function for printing character data in order to discriminate the copied recording paper and discriminating it.

As a function for post-processing the outputted recording paper, various kinds of post-processing apparatuses having a punching function for forming a punching hole and a folding function which can fold the recording paper in addition to the conventional stapling function can be provided.

In the numbering function and security printing function, in order to meet various demands of the user, a synthesizing position can be changed. Also with respect to the post-process, for example, the stapling position is not limited to the fixed position but it is possible to staple at the left upper position, right upper position, right lower position, left lower position, left center position, right center position, or the like in order to meet various demands of the user.

However, in the case where the function for synthesizing the character data such as numbering function, security printing function, or the like is combined with the post-process and used, there are problems such that if the positions overlap with each other, numbered character image data becomes difficult to see or is dropped out, and in the case where the folding function is used, if the character data is printed to the folded side of the paper, it is difficult to see, and the like.

SUMMARY OF THE INVENTION

In consideration of the above conventional problems, it is an object of the invention to provide an image forming apparatus or the like which can obtain an optimum output even in case of combining a function for synthesizing character data such as numbering function, security printing function, or the like with a post-processing function.

To accomplish the above object, according to the invention, there is provided an image forming apparatus comprising: character data forming means for forming character data; synthesizing means for synthesizing the character data formed by the character data forming means with image data; image output means for printing a synthesis result of the synthesizing means onto a sheet; sheet post-processing means for performing a post-process to the sheet outputted by the image output means; and adjusting means for adjusting a printing position of the character data and a processing position of the sheet post-processing means.

The above and other objects and features of the present invention will become apparent from the following detailed description and the appended claims with reference to the accompanying drawings.

BRIEF DESCRIPTION OF THE DRAWINGS

FIG. 4 is a diagram showing a data storing format of an ROM 130;

DETAILED DESCRIPTION OF THE PREFERRED EMBODIMENTS

Embodiments of the invention will be described hereinbelow with reference to the drawings.

First Embodiment

Whole Construction of a Copying Apparatus

Figure 1:
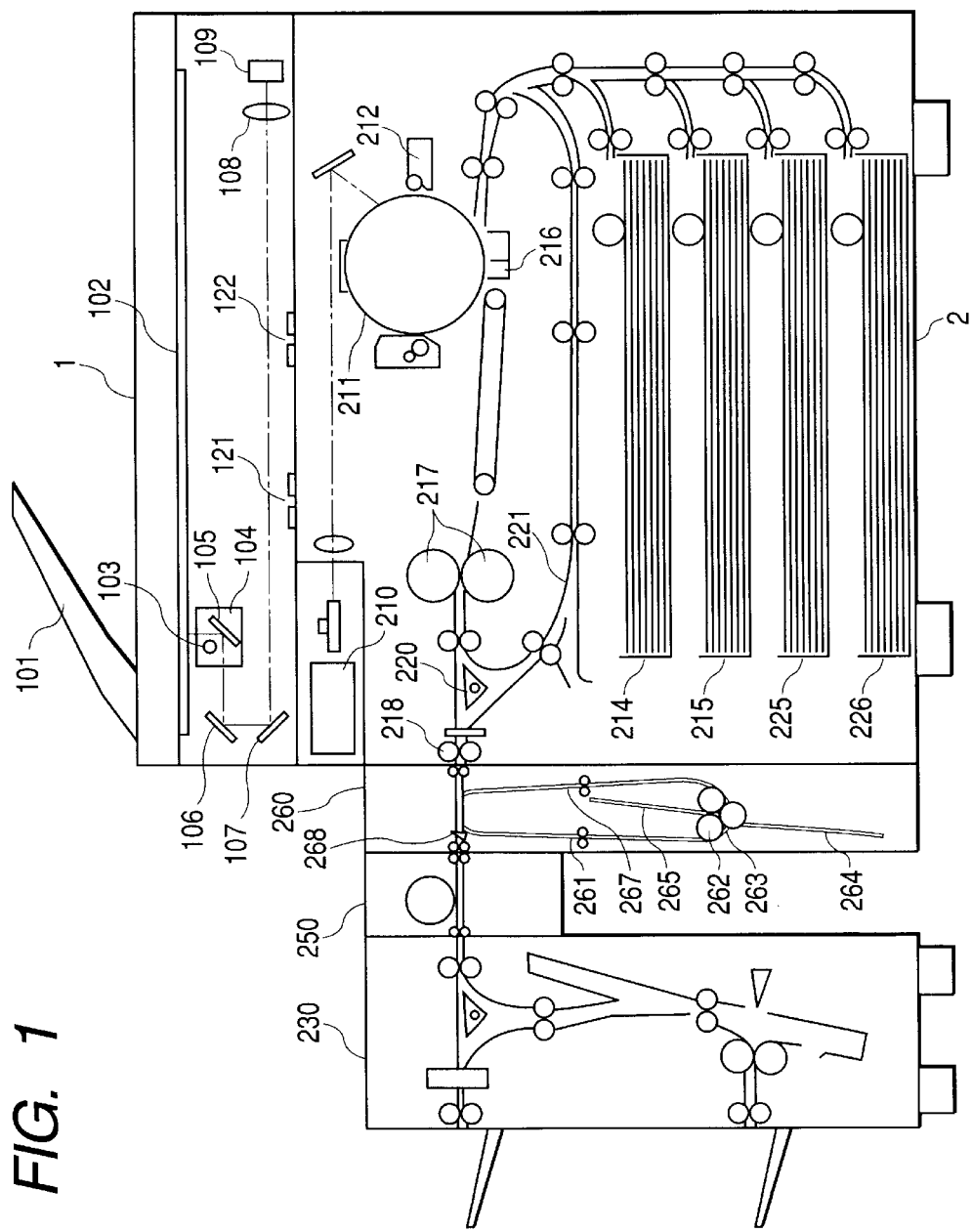
FIG. 1 is a cross sectional view showing a whole construction of a copying apparatus as an image forming apparatus according to the first embodiment of the invention.

FIG. 1 is a cross sectional view showing a whole construction of a digital copying apparatus as an image forming apparatus according to the first embodiment of the invention.

The copying apparatus shown in the diagram is constructed by a reader unit 1 and a printer unit 2.

An original put on a document feeder 101 is sequentially conveyed one by one onto a copyboard glass surface 102. When the original is conveyed to a predetermined position on the glass surface 102, a lamp 103 of the reader unit 1 is lit on, a scanner unit 104 is moved, and the original is irradiated. Reflected light from the original is inputted to a CCD image sensor unit 109 (hereinafter, referred to as a CCD) via mirrors 105, 106, and 107 and a lens 108.

Signal Process Construction of the Reader Unit 1

Figure 2:
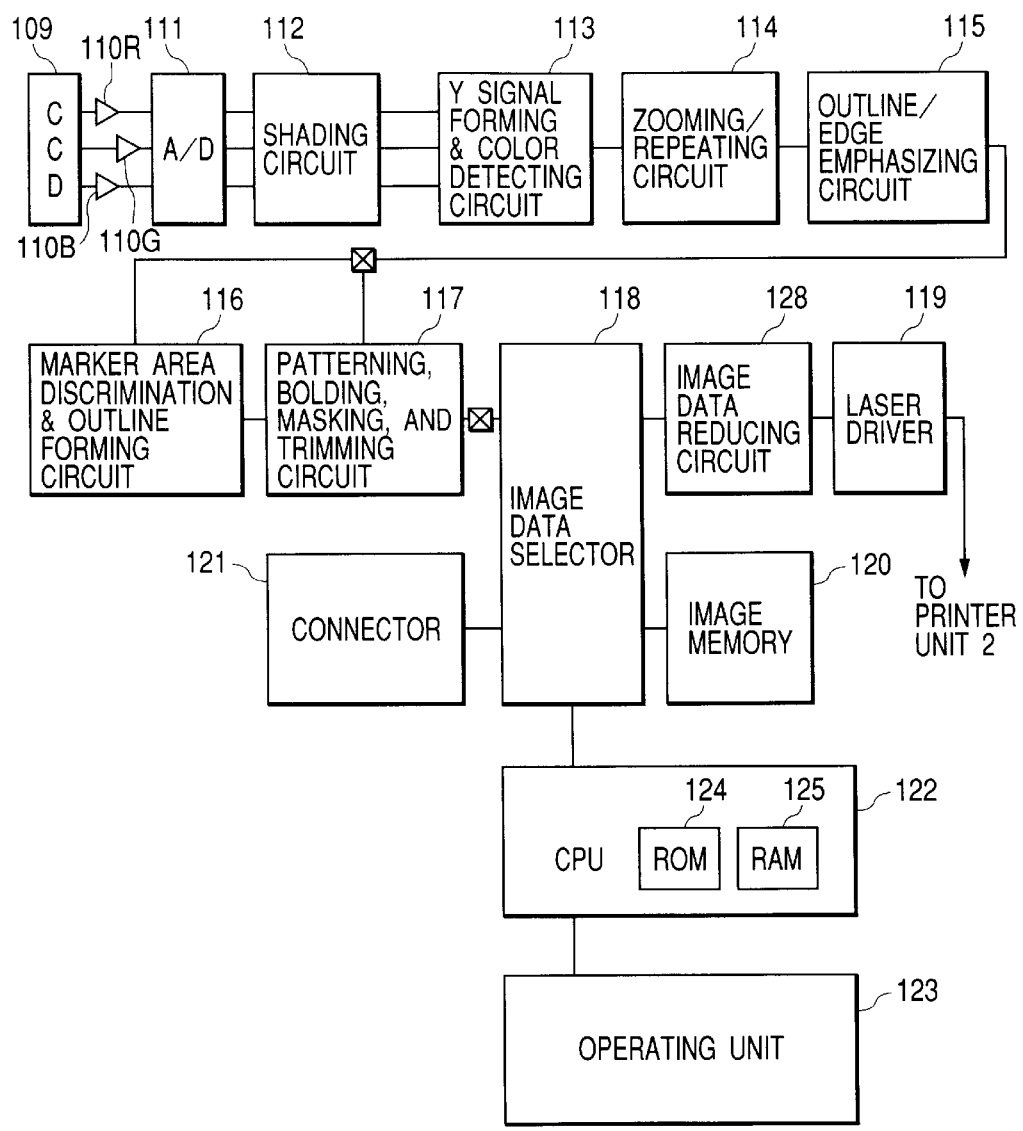
FIG. 2 is a circuit block diagram showing a signal process construction of a reader unit 1 according to the first embodiment.

FIG. 2 is a circuit block diagram showing a signal process construction of the reader unit 1 and its construction and operation will be explained hereinbelow.

The reflected light from the original inputted to the CCD 109 is photoelectrically converted here into electric signals of red, green, and blue colors. Color information from the CCD 109 is subsequently amplified by amplifiers 110R, 110G, and 110B in accordance with an input signal level of an A/D converter 111. Output signals from the A/D converter 111 are inputted to a shading circuit 112, by which a luminous intensity variation of the lamp 103 and a sensitivity variation of the CCD are corrected. Signals from the shading circuit 112 are inputted to a Y signal forming & color detecting circuit 113.

The Y signal forming & color detecting circuit 113 arithmetically operates the signals from the shading circuit 112 by the following equation and obtains a Y signal.

$$Y=0.3R+0.6G+0.1B$$

Further, the circuit 113 has a color detecting circuit for separating R, G, and B signals into seven colors and outputting signals corresponding to those colors. The output signal from the Y signal forming & color detecting circuit 113 is inputted to a zooming/repeating circuit 114. A zooming process in the sub-scanning direction is performed in accordance with a scanning speed of the scanner unit 104. A zooming process in the main scanning direction is performed by the zooming/repeating circuit 114. A plurality of same images can be also outputted by the zooming/repeating circuit 114.

An outline/edge emphasizing circuit 115 emphasizes a high frequency component of a signal from the zooming/repeating circuit 114, thereby obtaining edge emphasized & outline information. A signal from the outline/edge emphasizing circuit 115 is inputted to a marker area discrimination & outline forming circuit 116 and a patterning, bolding, masking, and trimming circuit 117.

The marker area discrimination & outline forming circuit 116 reads a portion written with a marker pen of a designated color on the original and forms outline information of the marker. A bolding, masking, or trimming process is subsequently executed from the outline information by the patterning, bolding, masking, and trimming circuit 117. A patterning process is also executed in accordance with the color detection signal from the Y signal forming & color detecting circuit 113.

An output signal from the patterning, bolding, masking, and trimming circuit 117 is selected by an image data selector 118, which will be explained hereinlater, in case of outputting the signal to the printer unit 2. The signal is converted into a signal of a recording resolution by an image data reducing circuit 128 and subsequently inputted to a laser driver 119, by which the signals subjected to various processes as mentioned above is converted into a signal for laser driving. An output signal from the laser driver 119 is inputted to the printer unit 2, by which a visible image is formed.

An original direction detecting circuit 150 can detect the top side (upper, lower, left, right), vertical writing, and lateral writing of the original as disclosed in Japanese Patent Application Laid-open No. 9-247427.

Function of Image Memory 120

Figure 3:
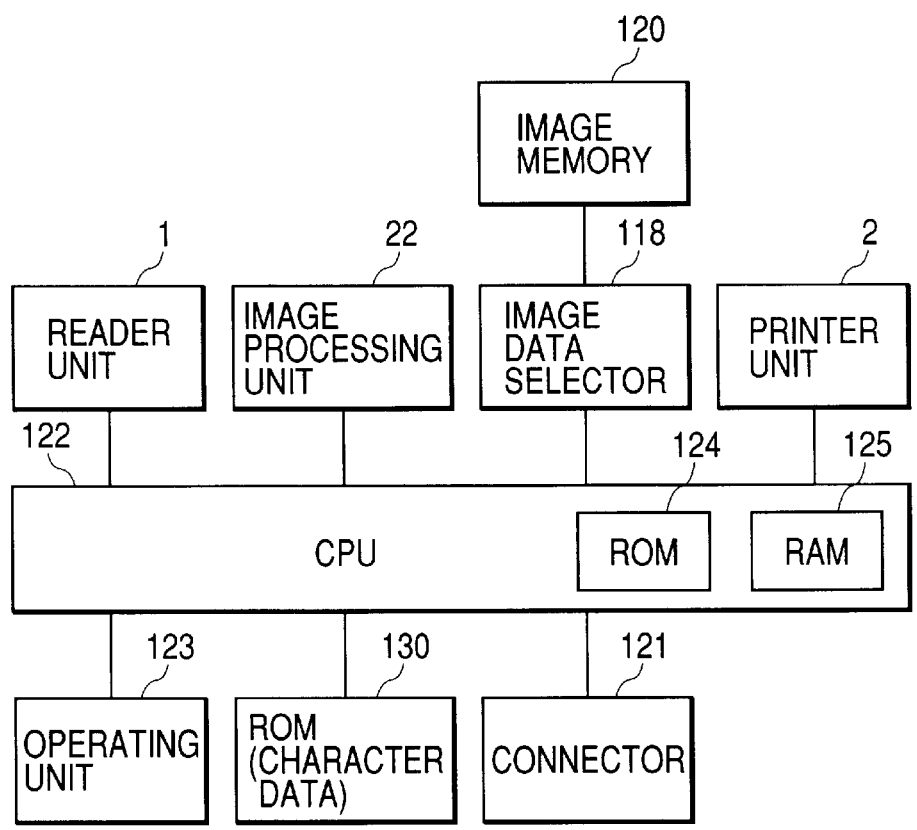
FIG. 3 is a block diagram showing a main electrical construction of the copying apparatus according to the first embodiment.

FIG. 3 is a block diagram showing a main electrical construction of the copying apparatus according to the embodiment.

An image memory 120 has a synthesizing function for storing and reading out the image data sent by an image data selector 118 to/from a designated position in the image memory 120 and performing a rotating process or a synthesizing process, executing a rotating process, and synthesizing the image in the memory by an instruction from a CPU 122 by a method, which will be explained hereinlater.

The CPU 122 controls the reader unit 1 and is constructed by: an ROM 124 for storing a control program, an error processing program, and the like; an RAM 125 which is used for a work area or the like of various programs; various timer control units; and the like. The ROM 130 is an ROM in which character images have been stored. Image data with a construction shown in FIG. 4 has been stored in the ROM 130.

The CPU 122 reads out character codes to be printed from the ROM 130 and develops them as bit map image data into the image memory 120 by a method, which will be explained hereinlater. The CPU 122 can also develop image data stored in an RAM into the image memory 120 by an instruction from the CPU 122.

An operating unit 123 has: various keys for instructing the image operation for designating image edition contents corresponding to the image process of the reader unit 1, the number of copies, and the like; a display unit for displaying contents upon operation; and the like.

Details of Operating Unit 123

Figure 5:
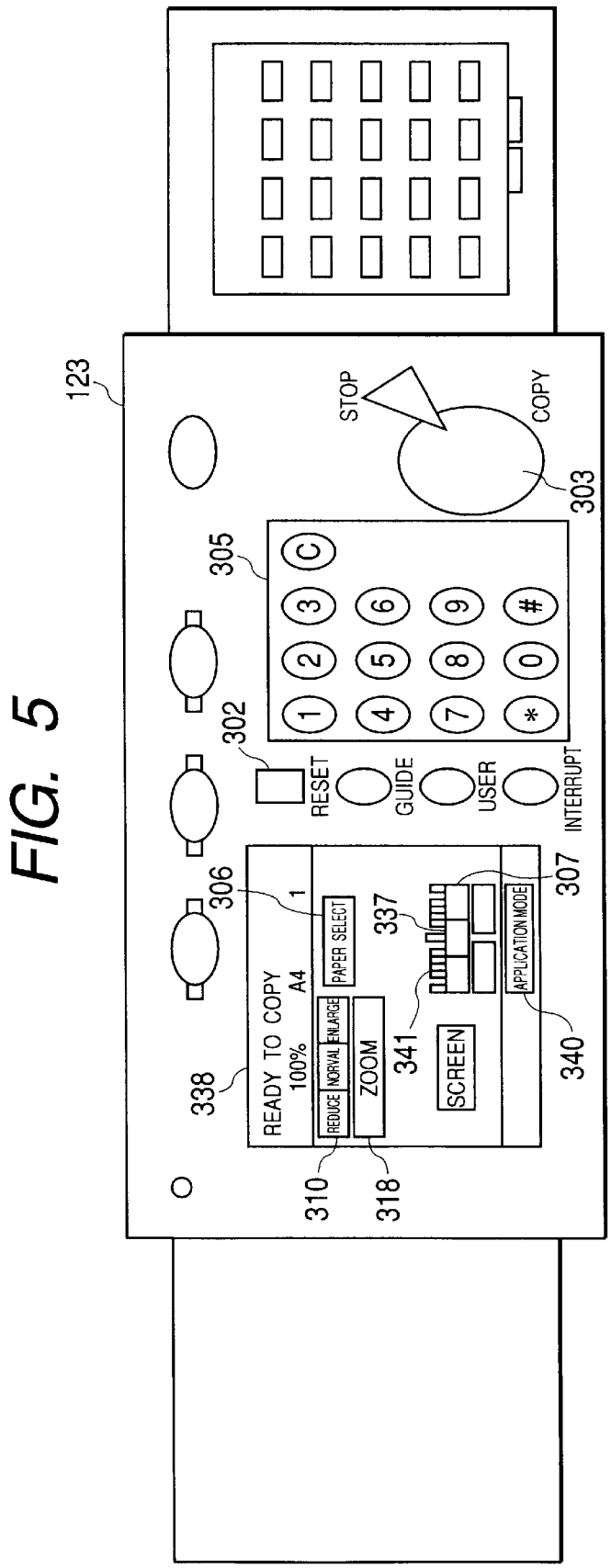
FIG. 5 is a diagram showing details of an operating unit 123.

FIG. 5 is a diagram showing details of the operating unit 123 of the embodiment.

Various keys and a liquid crystal display unit 338 comprising a liquid crystal display apparatus and constructed by a dot matrix are arranged in the operating unit 123. The liquid crystal display unit 338 displays a state of the apparatus, the number of copies, a magnification, the selected paper, and various operation picture planes and is operated by a control key or the like.

A start key 303 is a key to start the copying operation. A reset key 302 is a key to reset a set mode to a normal mode. A key group 305 is constructed by ten-key of 0 to 9 and the like for inputting the number of copies, a zoom magnification, or the like, and a clear key for clearing the input value. A density key 307 is a key for increasing or decreasing density. The density adjusted by the density key 307 is displayed on an indicator unit 341.

A key 337 is a key to turn on/off an automatic density adjusting function and its indicator unit. A key 306 is a key to select a sheet cassette and an auto paper selecting mode. The selected mode is displayed by the liquid crystal display unit 338. A key 310 is a key to set a direct copy or a regular reduction/enlargement size copy. A key 318 is a key to set an auto zooming mode key. The selected mode is also displayed by the liquid crystal display unit 338. A key 340 is an application mode key. By pressing the key 340, a picture plane of FIG. 24, which will be explained hereinlater is opened and the numbering function and finishing function can be set.

Storing Method and Reading Method of Image

A storing method and reading method of the image will now be described.

FIGS. 6A, 6B, 7A, 7B, and 8 are diagrams showing memory reading methods.

Figure 6A:
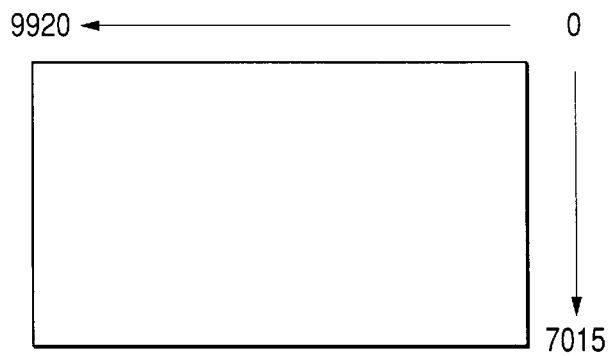
FIGS. 6A and 6B are diagrams showing a memory reading method.
Figure 9:
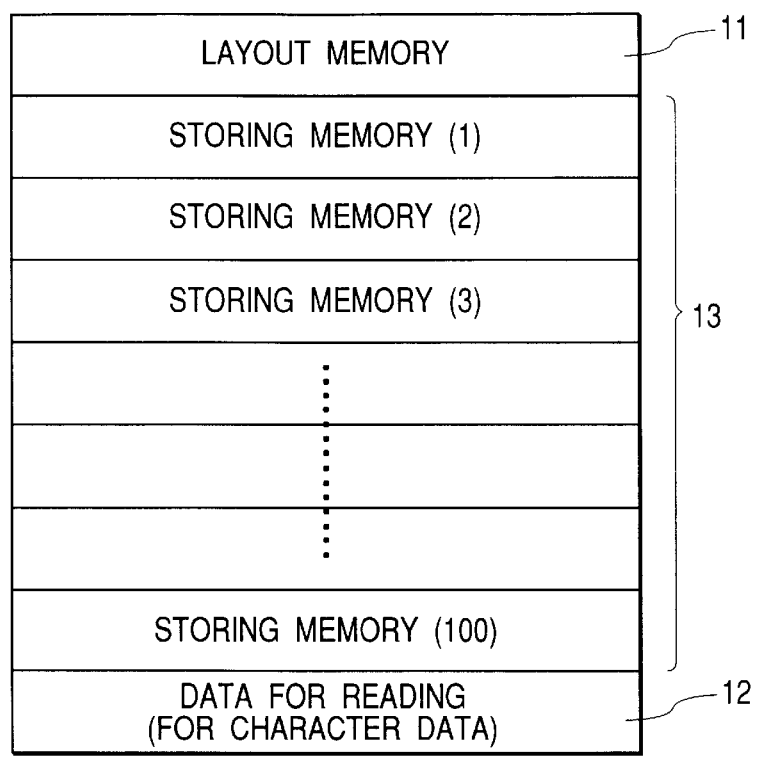
FIG. 9 is a diagram showing a data storing format of an image memory 120.

FIG. 6A shows one memory capacity of the image memory 120. In the embodiment, data of an image corresponding to the A3 size can be stored in case of a reference resolution of 600 dpi and it is constructed by (7015 bits in the vertical direction)×(9920 bits in the lateral direction). As shown in FIG. 9, this memory area is constructed by: one image layout area 11; one data area 12 for characters; and a storing memory area 13 which can store 100 images as an image memory area.

Figure 6B:
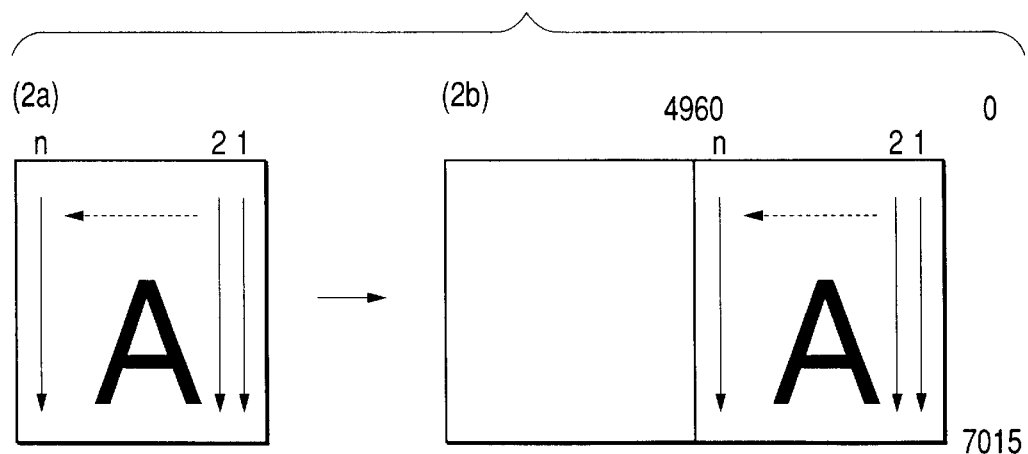

FIG. 6B shows an example in the case where the original image is stored into the image memory 120. The original put on the copyboard glass as shown in (2*a*) is sequentially read in the directions of arrows as shown in the diagram. When the image of the first line is first read, as shown in (2*b*), address (0, 0) is set to a start position, the count-up operation in the X direction and the count-up operation in the Y direction are designated, and count values of a counter in the Y direction are sequentially written in the direction of address (0, 7015).

Subsequently, when the image of the second line is read, a counter in the X direction is counted up and count values are sequentially written in the direction from address (1, 0) to address (1, 7015). Further, when the image of the third line is read, the counter in the X direction is counted up and count values are sequentially written in the direction from address (2, 0) to address (2, 7015). In this manner, the reading and writing operations are repeated and count values are written up to address (4960, 7015).

Figure 7A:
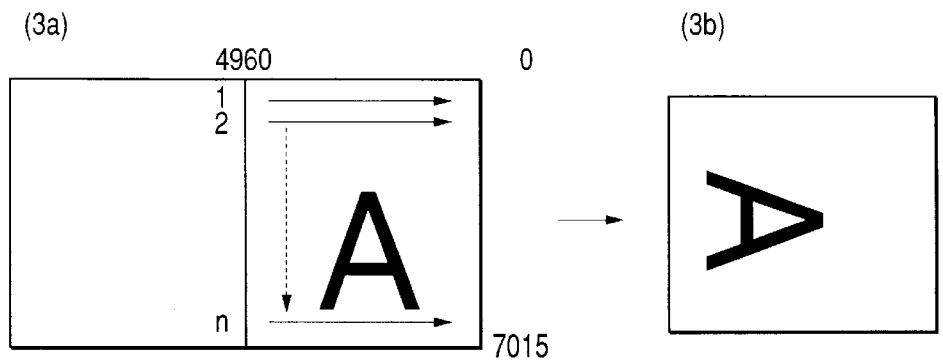
FIGS. 7A and 7B are diagrams showing the memory reading method.

Subsequently, as shown in FIG. 6B, a process for reading out the image data written in the image memory 120 will be described with reference to FIGS. 7A and 7B.

The stored data is read out as follows. That is, as shown in (3*a*) in FIG. 7A, first, when the image of the first line is read out, address (4960, 0) is set to a start position, the counter in the X direction is set to the count-down mode, the counter in the Y direction is set to the count-up mode, and count values are read out while the X counter is sequentially counted down in the direction of address (0, 0).

Subsequently, the Y counter is counted up, the image of the second line is read out, and count values are sequentially read out in the direction from address (4960, 1) to address (0, 1). By sequentially reading out the count values in this manner, an image as shown in (3*b*) can be read out.

Figure 7B:
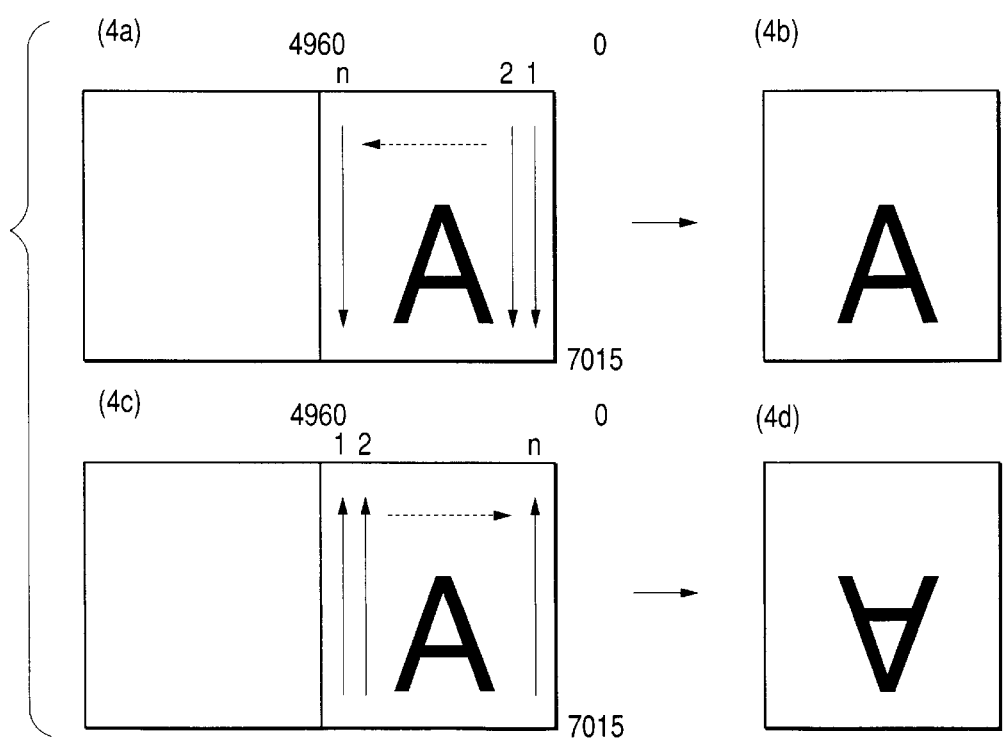

In FIG. 7B, the stored data is read out as follows. That is, as shown in (4*b*), first, when the image of the first line is read out, address (0, 0) is set to a start position, the counter in the X direction is set to the count-up mode, the counter in the Y direction is set to the count-down mode, and count values are read out while the Y counter is sequentially counted up in the direction of address (0, 7015). Subsequently, the X counter is counted up, the image of the second line is read out, and count values are sequentially read out in the direction from address (1, 0) to address (1, 7015). By sequentially reading out the count values in this manner, an image as shown in (4*b*) can be read out. Therefore, by reading out the original of a width of the A4 size shown in (2*a*) in FIG. 6B in the direction shown in FIG. 7A, the image can be read out without rotating it.

As shown in (4*c*), first, when the image of the first line is read out, address (4960, 7015) is set to a start position, the Y counter is counted down and count values are sequentially read out up to address (4960, 0). When the image of the second line is read out, the X counter is counted down, the Y counter is counted down from address (4959, 7015), and count values are sequentially read out up to address (4959, 0). By sequentially reading out the count values in this manner, an image like (4*d*) rotated by 180° can be read out as shown in FIG. 7B.

Figure 8:
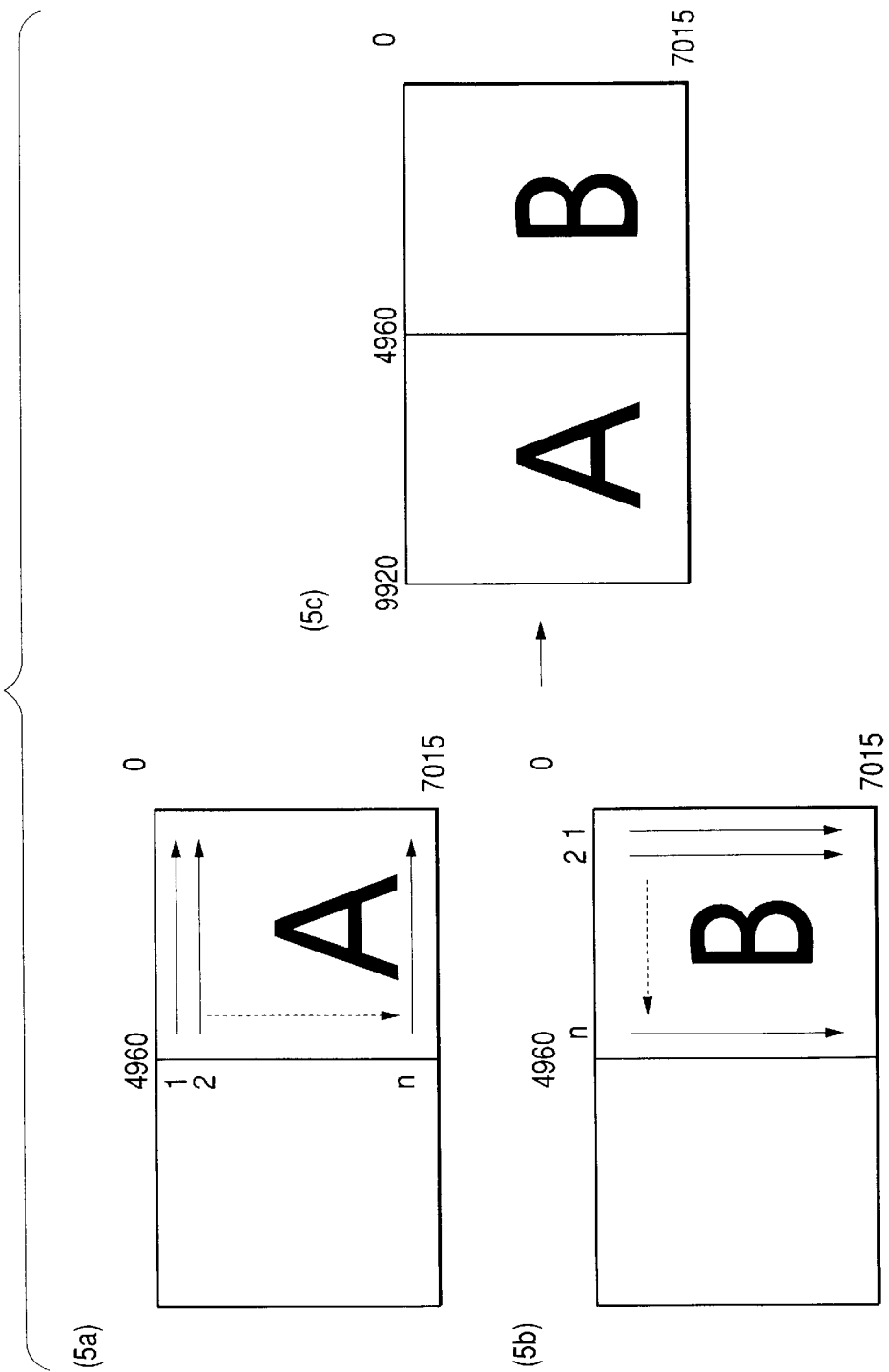
FIG. 8 is a diagram showing the memory reading method.

As mentioned above, by reading out stored images like (5*a*) and (5*b*) as shown in FIG. 8 and writing them to desired positions in the image layout memory 11, different original images can be synthesized on the memory 11 as shown in (5*c*) in FIG. 8.

Figure 10:
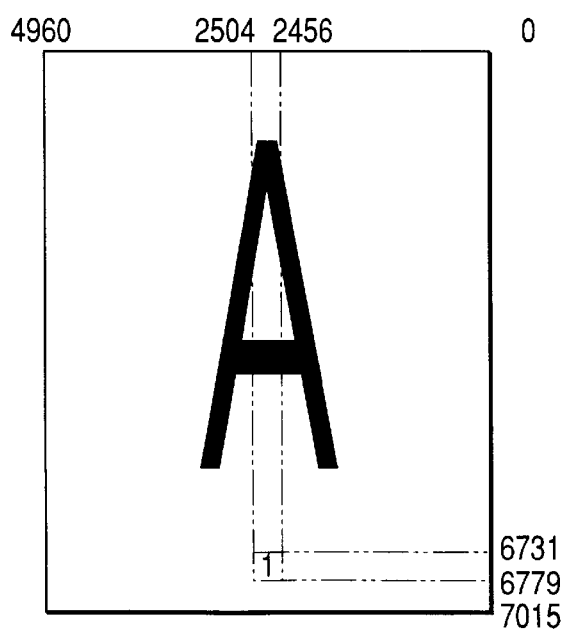
FIG. 10 is a diagram showing a method of developing character data into the image memory 120.

Subsequently, a method of reading out character data from the ROM 130 and developing it into the image memory 120 will be described with reference to FIG. 10.

Explanation will now be made with respect to the case where a page number "1" of 12 Point is added to a position corresponding to the center position in the X direction on the image and the position in the Y direction which is upwardly away from the bottom by 1 cm.

Since this position is the center in the X direction, a calculation (4960−48)/2=2456 is executed. Since this position is upwardly away from the bottom by 1 cm (236 dots) in the Y direction, a calculation

701−236−48=6731 is executed. Therefore, it is sufficient that the position at which the character is inserted is set to an area defined by a left upper position (2504, 6731), a right upper position (2456, 6731), a left lower position (2504, 6779), and a right lower position (2456, 6779).

Now, assuming that a head address of the character data is set to A, data of 6 bytes from the head address of the character data, which will be explained hereinlater, is read out in the direction from address (2504, 6731) to address (2456, 6731) and written into the layout memory 11. Subsequently, data of 6 bytes from address (A+6) is read out in the direction from address (2504, 6732) to address (2456, 6732) and written into the layout memory 11.

By similarly executing the above operation with respect to an area in a range from address (2504, 6779) to address (2456, 6779), the character data can be written into the memory 11.

At this time, with respect to the data writing method, the data can be overwritten or can be also OR-written. In case of performing the numbering function for adding a page number, the page number can be clearly printed by overwriting. In case of performing the security printing function for overwriting the serial number or the like to the background, the security printing function can be realized by OR-writing it.

The head address of the ROM 130 is now connected to address 8000000H. As shown in FIG. 4, bit map data of characters has been stored in the ROM 130. Numeral data of 8, 9, 10, 10.5, 12, and 16 Points has been stored in the ROM 130. One data of each Point consists of 48 bits×48 bits=288 bytes.

Since data of ten numerals consists of 2880 bytes, the sum of the data of the respective ten numerals corresponding to 8, 9, 10, and 10.5 Points is equal to 11520 bytes. Therefore, numeral 0 of 12 Point is read out from address 8002D00(H), numeral 1 is read out from address 8002F20(H), and they are written into address (2504, 6731). By repeating the operation as mentioned above, the character data can be synthesized.

Description of Printer Unit 2
Construction and Operation of Printer Unit 2

A construction and the operation of the printer unit 2 will now be described with reference to FIG. 1.

An image signal inputted to the printer unit 2 is converted into a light signal modulated by an exposure control unit 210. A developing drum (photosensitive material) 211 is irradiated by the light signal. A latent image formed on the photosensitive material 211 by the irradiated light is developed by a developing unit 212. Transfer paper is conveyed by transfer paper stacking unit 214, 215, 225, or 226 by matching the timing with a front edge of the developed image. The developed image is transferred by a transfer unit 216. The transferred image is fixed onto the transfer paper by a fixing unit 217 and subsequently ejected to the outside of the apparatus by a paper ejecting unit 218.

The transfer paper outputted from the paper ejecting unit 218 passes through a Z-folding unit 260. When a Z-folding function acts, the paper is Z-folded by the Z-folding unit 260 and subsequently passes through a punching unit 250. When a punching function acts, the paper is punched and conveyed to a sorter 230. When a sorting function acts in the sorter 230, the paper is ejected onto each bin. When the sorting function does not act, the paper is ejected onto the top bin of the sorter. When a staple sorting function acts, one of a plurality of stapling units provided for the sorting bins is selected and the ejected sheets of paper are stapled. By selecting one of the plurality of stapling units, the stapling position is changed. However, such an operation can be also realized by moving one stapling unit.

Description of Z-folding Unit 260

The Z-folding unit 260 for Z-folding the paper will now be described.

When a direction changing member 268 is made operative, the recording paper which entered the Z-folding unit 260 and whose size is matched with a predetermined size advances to a Z-folding unit path 261. At timing when ¼ of the recording paper has passed through a roller 262, folding rollers 262/263 rotate so as to advance the recording paper to an intermediate folding path 265. ¼ of the recording paper is folded by the rotating operation.

At timing when the recording paper advances as it is to the intermediate folding path 265, the folding rollers 262/263 rotate so as to advance the recording paper to a final path 267. Therefore, ¼ of the recording paper is folded and the Z-folding paper is obtained. Such a Z-folding process is applied only to the recording paper of a large size. In case of the recording paper of a small size, the direction changing member is made inoperative and the paper is conveyed to the punching unit 250.

Method of Outputting Images to Both Sides of One Output Paper

Subsequently, a method of outputting images which are sequentially read out to both sides of one sheet of output paper will be described.

The output paper fixed by the fixing unit 217 is once conveyed to the paper ejecting unit 218, thereafter, the conveying direction of the paper is reversed, and the paper is conveyed to a refeed transfer paper stacking unit 221 via a conveying direction switching member 220. When a next original is prepared, an image of the original is read out in a manner similar to the foregoing process. However, since the transfer paper is fed by the refeed transfer paper stacking unit 221, two original images can be eventually outputted to the obverse and reverse of the same output paper.

Sheet Post-process and Numbering Function

Subsequently, a case where the numbering function for synthesizing a page number onto a page which is printed and outputting the resultant page is made operative and a sheet post-process according to the feature of the invention will be described with reference to flowcharts of FIGS. 11 and 12.

Staple Setting

A case where the stapling position is set to the left upper position and the numbering position is set to the right lower position will now be described. When three originals of the A4 size are stacked onto the document feeder 101 and three copies are printed onto the recording paper of the A4 size, first, whether the numbering process is performed or not is discriminated (step S1). Character data for numbering is formed in order to perform the numbering process (step S2). The numbering position is discriminated (step S3).

Figure 13:
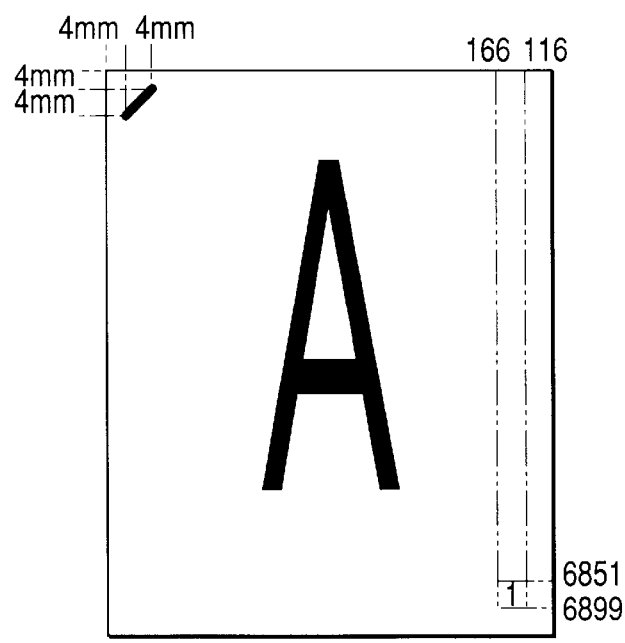
FIG. 13 is a diagram showing a case where character synthesis and a sheet post-process (stapling) are combined according to the first embodiment.

The right lower numbering position is predetermined to a position of 5 mm/5 mm from the paper edge as shown in FIG. 13. This position corresponds to the position of addresses (4844, 116), (4796, 116), (4844, 166), and (4796, 166).

In order to perform the stapling process (step S4, S6, S7), the stapling position is discriminated (step S8). The stapling position is set to the left upper position. In this case, the stapling process is performed at a position of 4 mm/4 mm/4 mm/4 mm shown in FIG. 13 and this position corresponds to the position of addresses (4886, 94), (4772, 94), (4886, 188), and (4772, 188) (step S8). When the stapling position and the numbering position are compared, they do not coincide (step S9). The numbering position is not changed (step S10). Synthesis for numbering is performed (step S11). The printing is performed (step S12). The stapling process is performed (step S13). The above processes are executed until the end of copy (steps S31 to S33).

A case where the stapling position is set to the left upper position and the numbering position is set to the left upper position will now be described.

When three originals of the A4 size are stacked onto the document feeder 101 and three copies are printed onto the recording paper of the A4 size, first, whether the numbering process is performed or not is discriminated (step S1). Character data for numbering is formed in order to perform the numbering process (step S2). The numbering position is discriminated (step S3).

The left upper numbering position is predetermined to a position of 5 mm/5 mm from the paper edge as shown in FIG. 13. Since one character is constructed by 48 dots, an image area where one character is inserted is set to the position of addresses (166, 6851), (118, 6851), (166, 6899), and (118, 6899). In order to perform the stapling process (step S7), the stapling position is discriminated (step S8).

Figure 14:
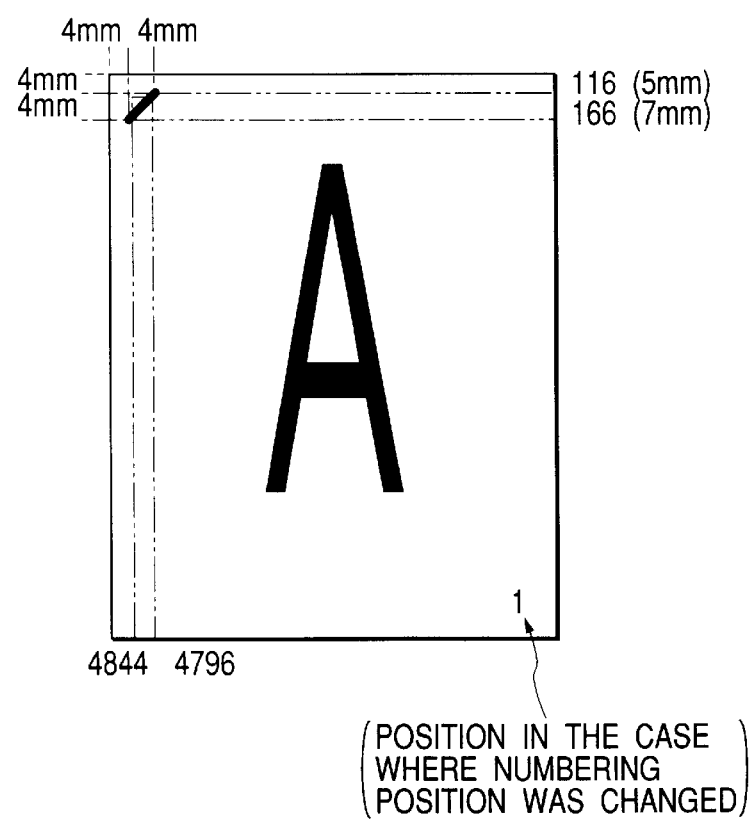
FIG. 14 is a diagram showing a case where the character synthesis and the sheet post-process (stapling) are combined according to the first embodiment.

The stapling position is set to the left upper position. In this case, the stapling process is performed at a position of 4 mm/4 mm/4 mm/4 mm shown in FIG. 14 and this position corresponds to the position of addresses (4886, 94), (4772, 94), (4886, 188), and (4772, 188) (step S8). When the stapling position and the numbering position are compared, since they coincide (step S9), the numbering position is changed (step S10).

If the changed numbering position does not overlap with the stapling position, it is not particularly specified. However, the numbering is performed at the right lower position here. The synthesis for numbering is performed at a position defined by addresses (4844, 116), (4796, 116), (4844, 166), and (4796, 166) (step S11). The printing is performed (step S12). The stapling process is performed (step S13). The above processes are executed until the end of one copy (steps S31 to S33).

Figure 15:
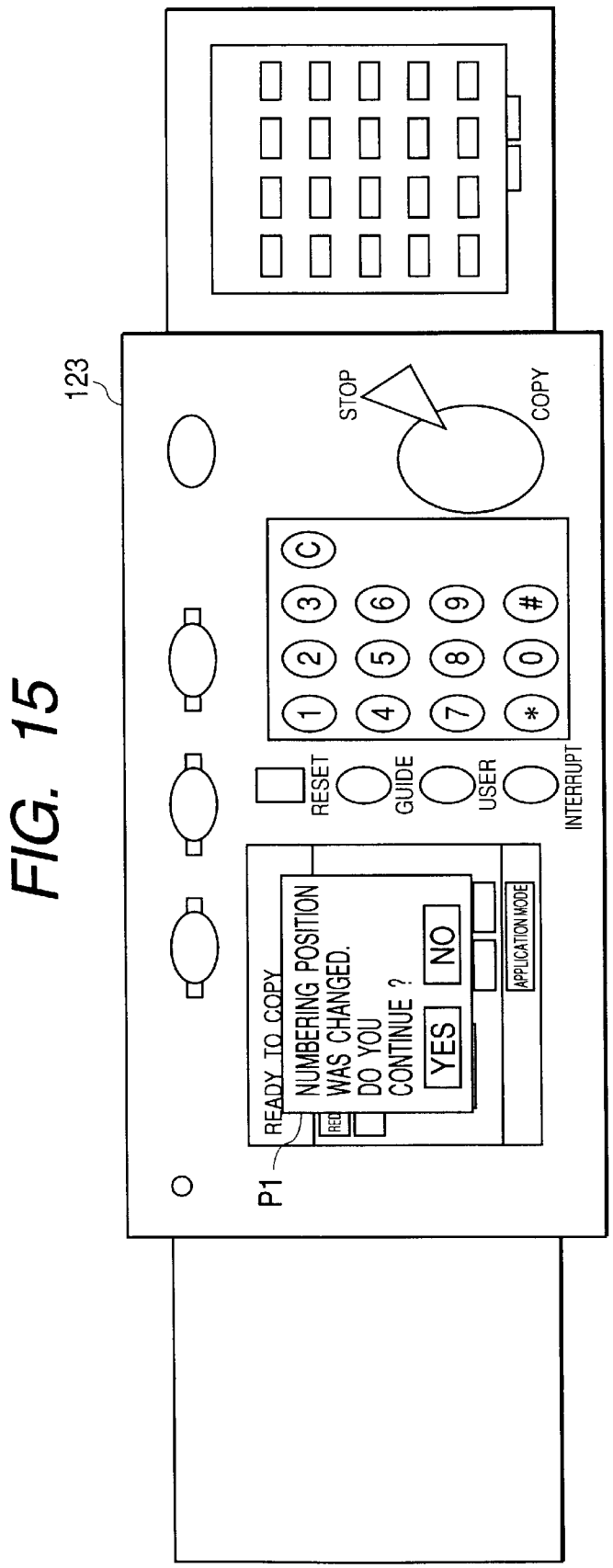
FIG. 15 is a diagram showing a display example of the operating unit at the time of change confirmation according to the first embodiment.

In this instance, a display P1 as shown in FIG. 15 is displayed in the operating unit 123. The user is requested to confirm whether the process is continued or not. If the user determined that the process can be continued, the above processes are executed until the end of copy (steps S33 to S31).

Figure 16:
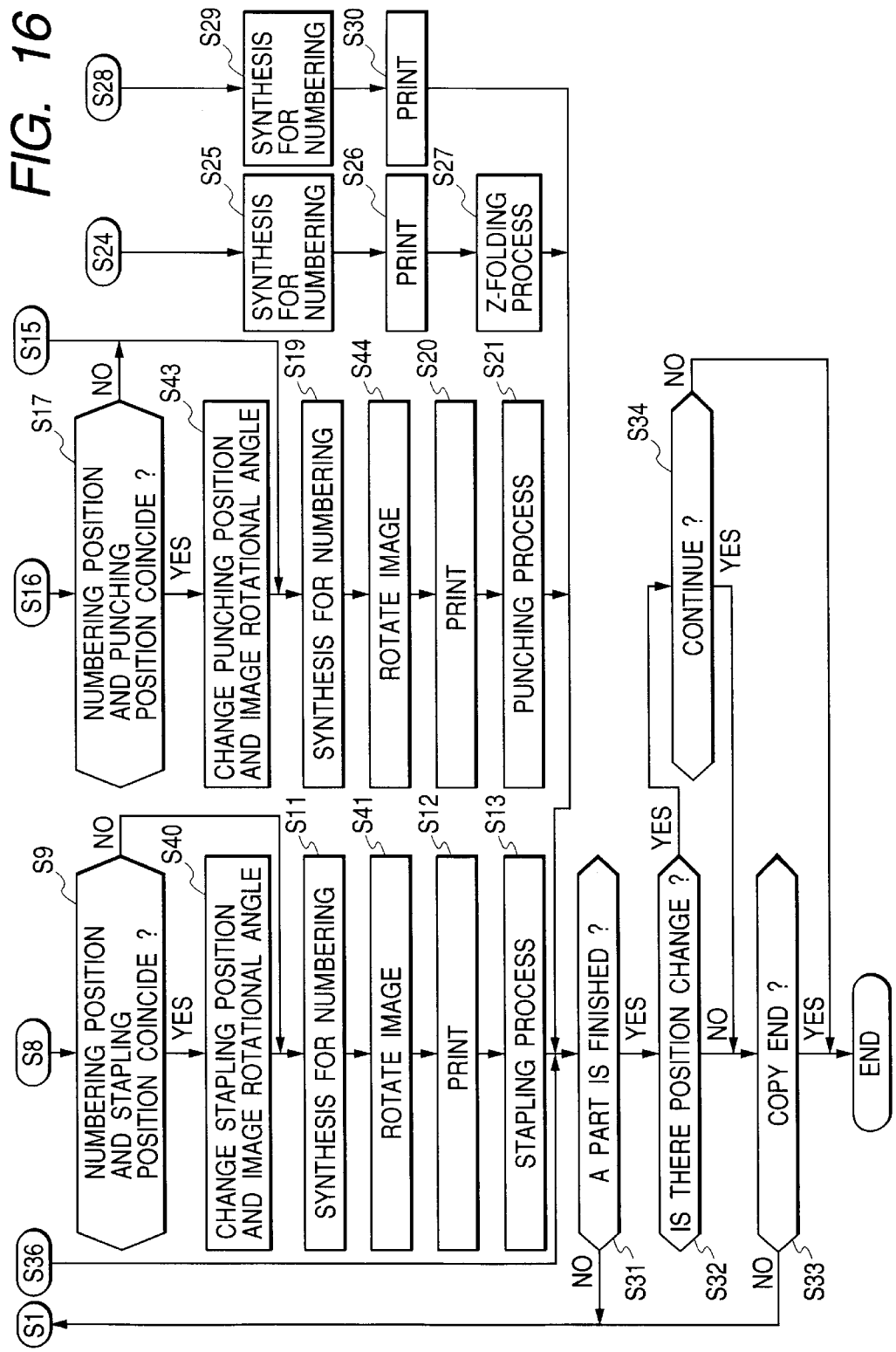
FIG. 16 is a flowchart showing a case of changing a finishing position according to the first embodiment.
Figure 17:
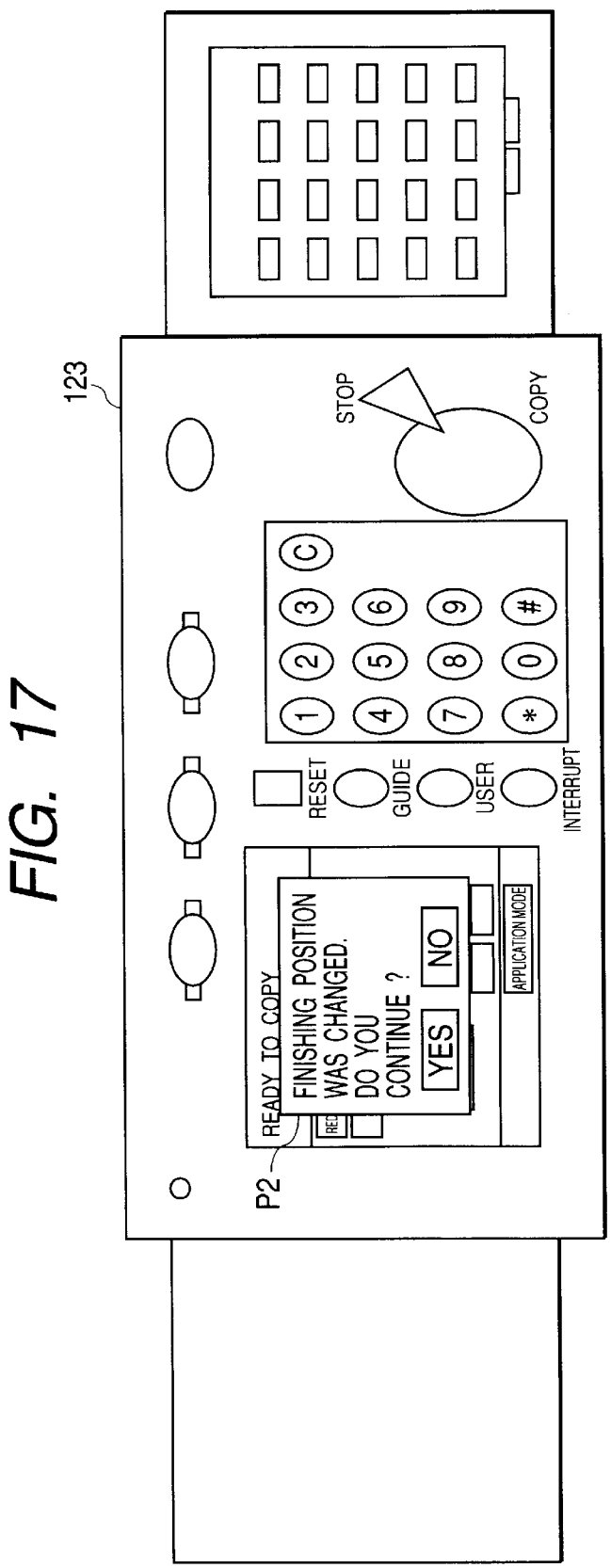
FIG. 17 is a diagram showing a display example of the operating unit at the time of change confirmation according to the first embodiment.

When the stapling position and the numbering position coincide, the stapling position can be also changed. In this case, the flowchart of FIG. 16 is used in place of the flowchart of FIG. 12. As shown in the flowchart of FIG. 16, it is assumed that the stapling is performed at the right upper position (step S40). The stapling is performed at the position of 4 mm/4 mm from the right upper position. In case of stapling at the right upper position, the synthesized image is rotated by 180° and the printing is performed (steps S41, S12, S13). The above processes are executed until the end of one copy (steps S31 to S33). In this instance, a display P2 as shown in FIG. 17 is displayed in the operating unit 123. The user is requested to confirm whether the process is continued or not. If the user determined that the process can be continued, the above processes are executed until the end of copy.

Punching

A case where the punching mode has been set will now be described.

Figure 18:
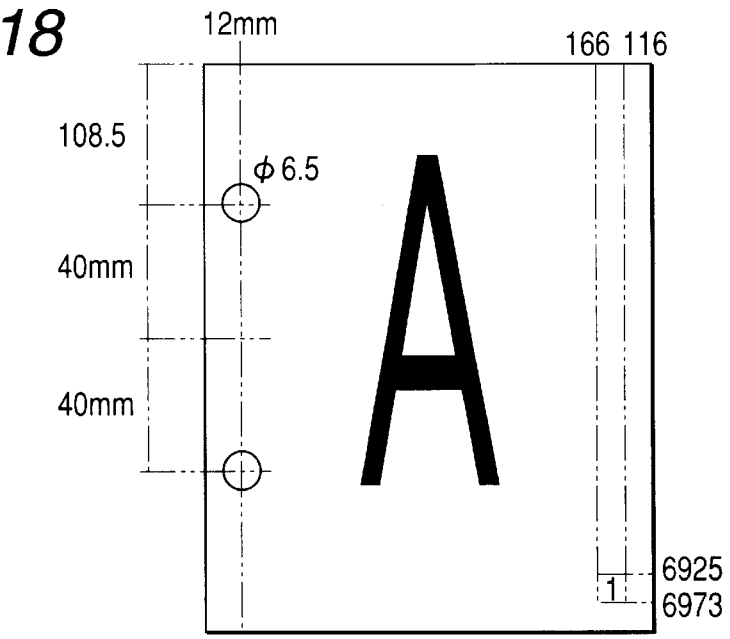
FIG. 18 is a diagram showing a case where the character synthesis and a sheet post-process (punching) are combined according to the first embodiment.

When three originals of the A4 size are stacked onto the document feeder 101 and three copies are printed onto the recording paper of the A4 size, first, whether the numbering process is performed or not is discriminated (step S1). In order to perform the numbering process (step S2), the numbering position is discriminated (step S3). The right lower numbering position is predetermined to a position of 1 cm/1 cm from the paper edge shown in FIG. 18. This position corresponds to a position defined by addresses (90, 6925), (42, 6925), (90, 6973), and (42, 6973).

To punch (steps S14, S15), a punching position is discriminated (step S16). Punching holes are formed on the left side of the original to be punched. Therefore, as punching positions, punching holes each having a diameter of 6.5 mm are formed at positions shown in FIG. 18 around positions of 108.5 mm/12 mm and 188.5 mm/12 mm as centers, respectively, and these positions correspond to positions of addresses (4677, 2562) and (4677, 4452) (step S16).

When the punching position and the numbering position are compared, since they do not coincide (step S17), the numbering position is not changed (step S18). Synthesis for numbering is performed (step S19). The printing is performed (step S20). The punching process is performed (step S21). The above processes are executed until the end of copy (steps S31 to S33).

A case where the punching mode is set and the numbering is performed at the left upper position will now be described.

Figure 19:
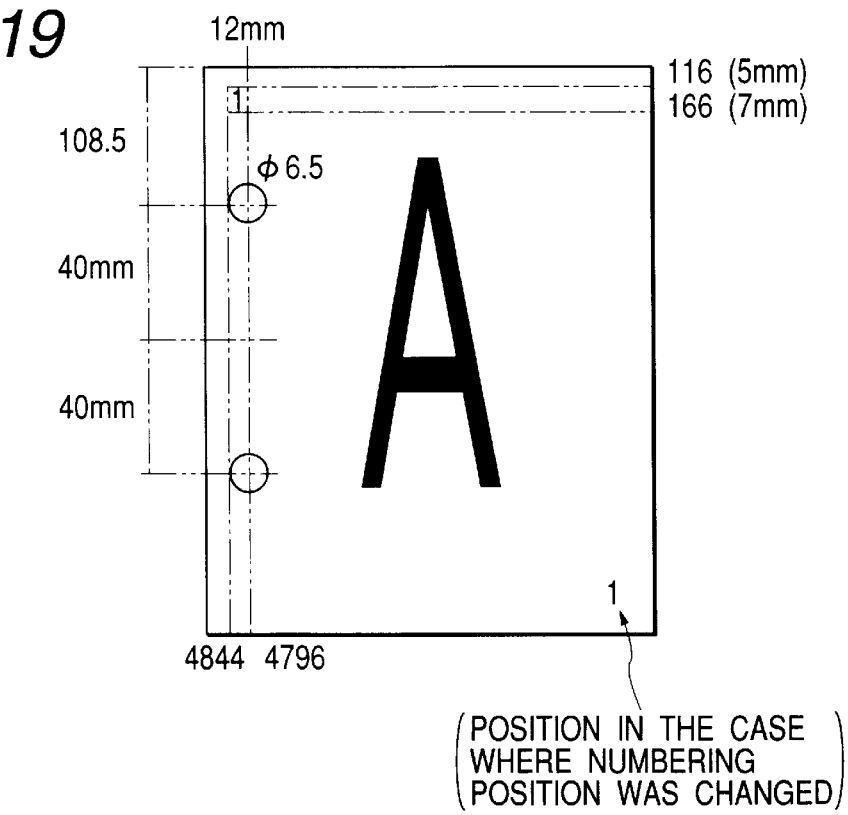
FIG. 19 is a diagram showing a case where the character synthesis and the sheet post-process (punching) are combined according to the first embodiment.

When three originals of the A4 size are stacked onto the document feeder 101 and three copies are printed onto the recording paper of the A4 size, first, whether the numbering process is performed or not is discriminated (step S1). In order to perform the numbering process (step S2), the numbering position is discriminated (step S3). The left upper numbering position is predetermined to a position of 5 mm/5 mm from the paper edge shown in FIG. 19. This position corresponds to a position defined by addresses (166, 6851), (118, 6851), (166, 6899), and (118, 6899).

To punch (step S15), a punching position is discriminated (step S16). Punching holes are formed on the left side of the original to be punched. Therefore, as punching positions, punching holes each having a diameter of 6.5 mm are formed at positions shown in FIG. 19 around positions of 108.5 mm/12 mm and 188.5 mm/12 mm as centers, respectively, and these positions correspond to positions of addresses (4677, 2562) and (4677, 4452) (step S16).

When the punching position and the numbering position are compared, it is intended to perform the numbering at a position on the inner side of the punching position. If the numbering is performed at this position, when the paper is filed, the printed number cannot be seen (step S17). To prevent such a situation, the numbering position is changed (step S18).

Although the changing position is not specified particularly, it is sufficient to perform the numbering at a position on the outer side of the punching position. Therefore, the numbering position is changed to, for example, the right lower position. That is, the numbering position is changed to a position defined by addresses (42, 6925), (90, 6925), (90, 6973), and (42, 6973). The synthesis for numbering is performed (step S19). The printing is performed (step S20). The punching process is performed (step S21). The above processes are executed until the end of one copy (steps S31 to S33).

In this instance, the display P1 as shown in FIG. 15 is displayed in the operating unit 123. The user is requested to confirm whether the process is continued or not. If the user determined that the process can be continued, the above processes are executed until the end of copy (steps S31 to S33).

The punching position can be also changed. To change the punching position, it is sufficient to rotate the image by 180° and output the rotated image. By this process, punching holes can be formed on the right side of the image. As shown in the flowchart of FIG. 16, therefore, the numbering position is not corrected but, when the image data is read out from the image memory 120, the image is rotated by 180° and outputted (step S44). The printing is performed (step S20). The punching process is performed (step S21). The above processes are executed until the end of one copy (steps S31 to S33). In this instance, the display P2 as shown in FIG. 17 is displayed in the operating unit 123. The user is requested to confirm whether the process is continued or not. If the user determined that the process can be continued, the above processes are executed until the end of copy.

Z-folding Process

A case where the Z-folding process has been set will now be described.

Figure 20:
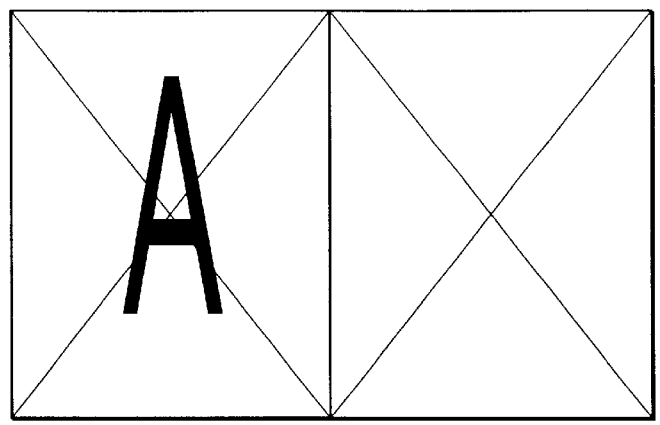
FIG. 20 is a diagram showing a case where the character synthesis and a sheet post-process (Z-folding process) are combined according to the first embodiment.

When three originals of the A3 size are stacked onto the document feeder 101 and three copies are printed onto the recording paper of the A3 size, first, whether the numbering process is performed or not is discriminated (step S1). In order to perform the numbering process (step S2), the numbering position is discriminated (step S3). The center numbering position is predetermined to a center position/1 cm from the paper edge shown in FIG. 20. This position corresponds to a position defined by addresses (4984, 6925), (4936, 6925), (4984, 6973), and (4936, 6973).

Figure 21A:
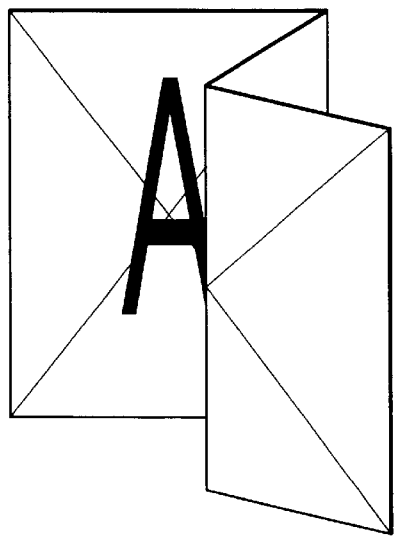
FIGS. 21A and 21B are diagrams showing cases where the character synthesis and the sheet post-process (Z-folding process) are combined according to the first embodiment.
Figure 21B:
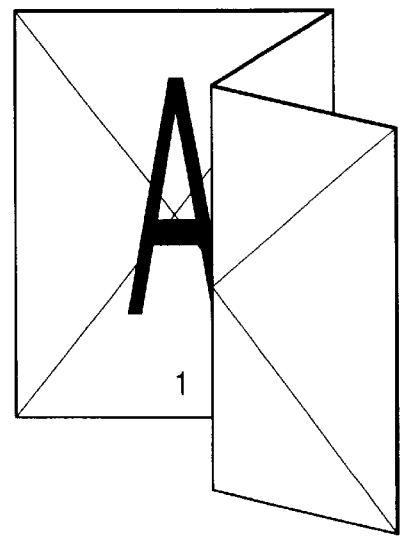

The Z-folding process is performed only to the large paper and the paper is folded at the center of the paper. When the numbering position is set to the center position/1 cm, as shown in FIGS. 21A and 21B, the numbering process is performed at the folding position, so that the number printed here is hard to see. To prevent such a situation, the numbering position is deviated. Whether the paper is large paper to which the Z-folding process is performed or not is discriminated (step S23). Since the A3 size corresponds to the large paper, the numbering position is changed (step S24).

Figure 22:
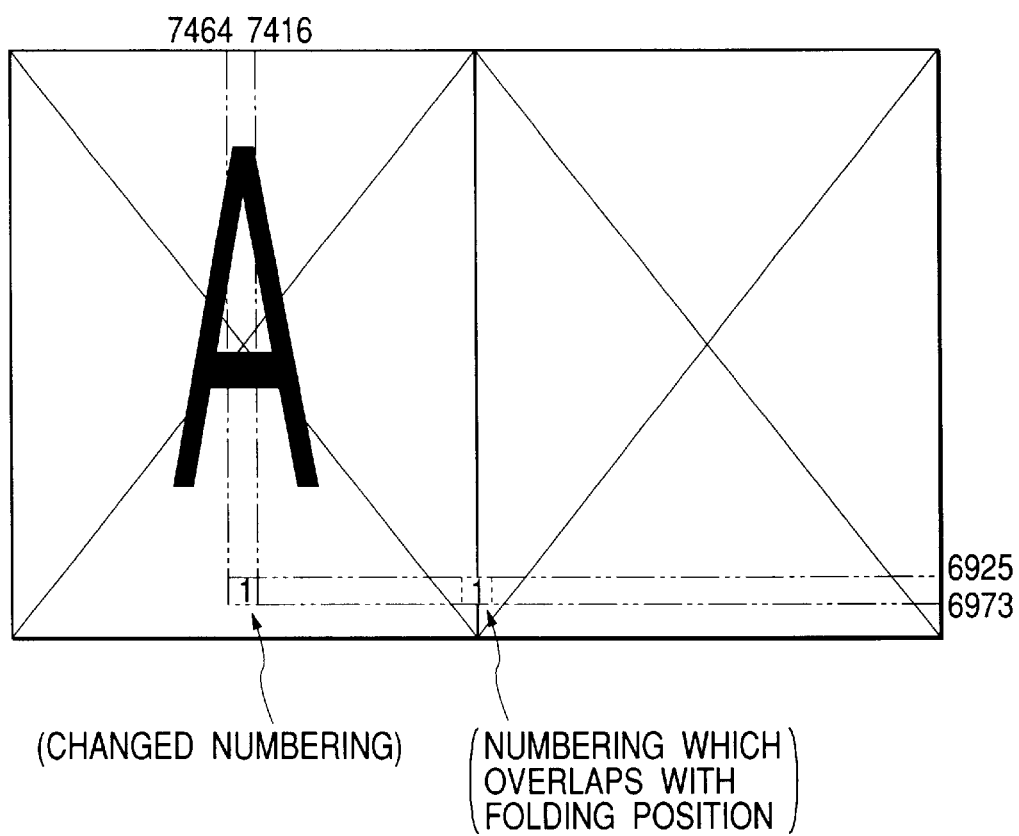
FIG. 22 is a diagram showing a case where the character synthesis and the sheet post-process (Z-folding process) are combined according to the first embodiment.

The numbering is performed at the center position/1 cm of the A4-size paper as a half area of the A3-size paper as shown in FIG. 22. As shown in FIG. 22, as for this position, the numbering position is changed to a position defined by addresses (7464, 6925), (7416, 6925), (7464, 6973), and (7416, 6973) and the number is synthesized (step S25). The printing is performed (step S26). The Z-folding process is performed (step S27). The above processes are executed until the end of copy (steps S31 to S33).

If the paper is not the large-sized paper (step S23), the numbering position is not changed (step S28) but the synthesis for numbering is performed (step S29). The printing is performed (step S30) The above processes are executed until the end of copy (steps S31 to S33).

If it is determined that the discrimination result in each of the stapling setting (step S6), the punching setting (step S14), and the Z-folding setting (step S22) is NO, the processing routine advances to step S28 and subsequent steps and processes similar to those mentioned above are executed.

Further, if it is determined that the sheet post-process is not performed in step S4, the synthesis for numbering is also executed (step S5) and the printing is also performed (step S36).

As mentioned above, in the embodiment, in the case where a combination of the function for synthesizing the character data such as a numbering function or the like and the sheet post-process are executed, by adjusting the position so that both positions do not overlap with each other, the printout can be properly performed. It is unnecessary for the user to wastefully output the printed paper.

Second Embodiment

In the second embodiment, a case where the operation for adjusting the printing position of the character data in the numbering function or the like and the sheet post-processing position is executed by using the operating unit 123 will now be described.

Figure 23:
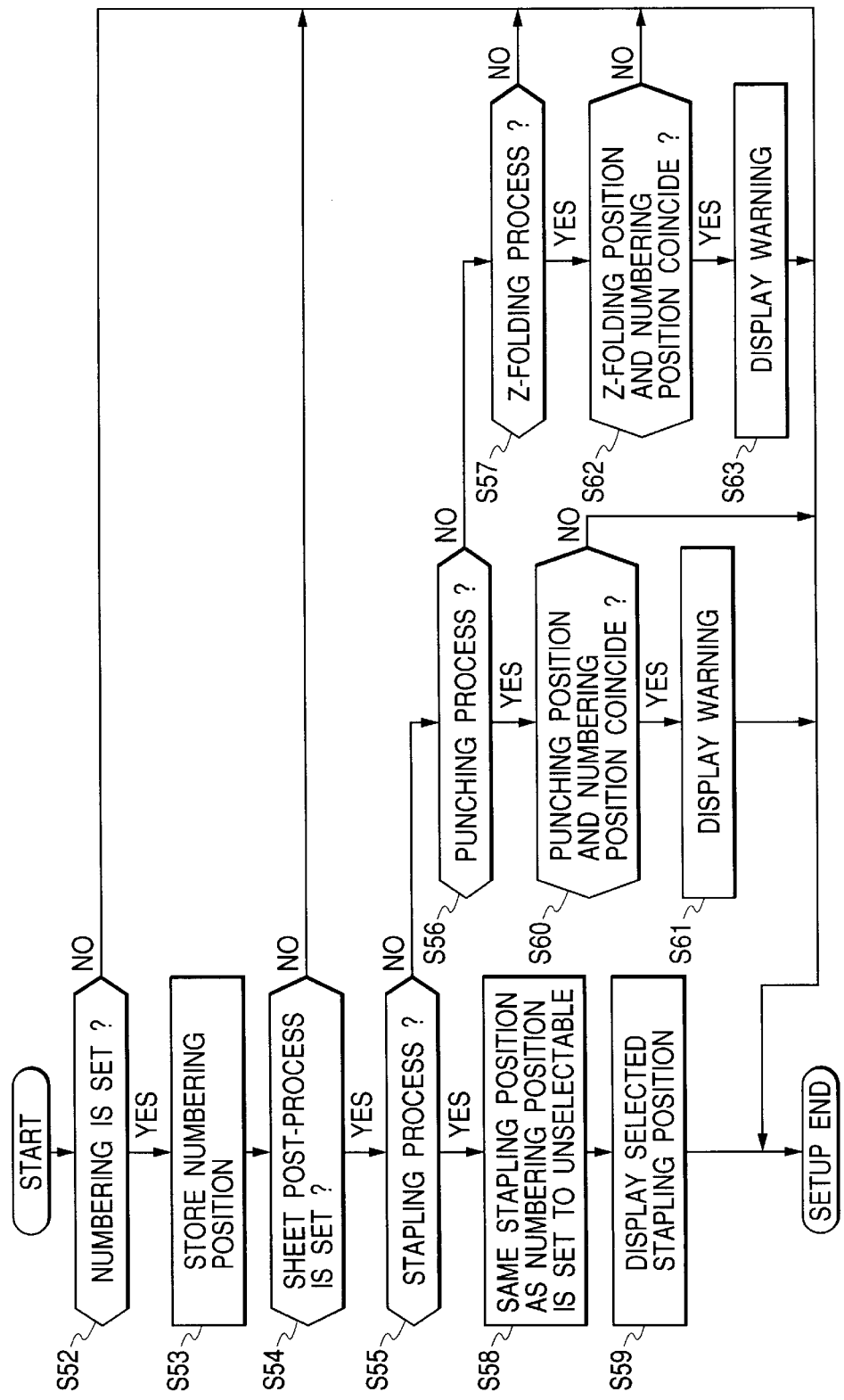
FIG. 23 is a flowchart showing the position adjusting operation upon setting of numbering and finishing according to the second embodiment of the invention.
Figure 24:
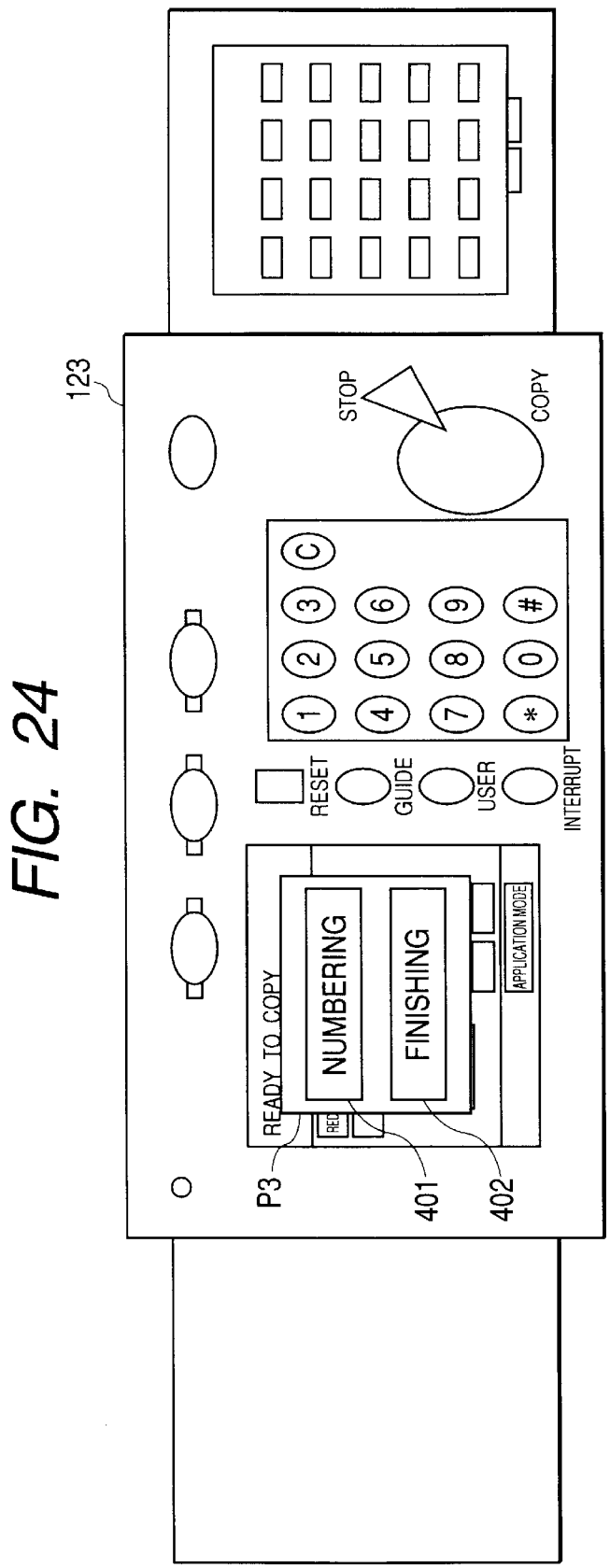
FIG. 24 is a diagram showing a display example of the operating unit 123 upon setting of the numbering and finishing according to the second embodiment.
Figure 25A:
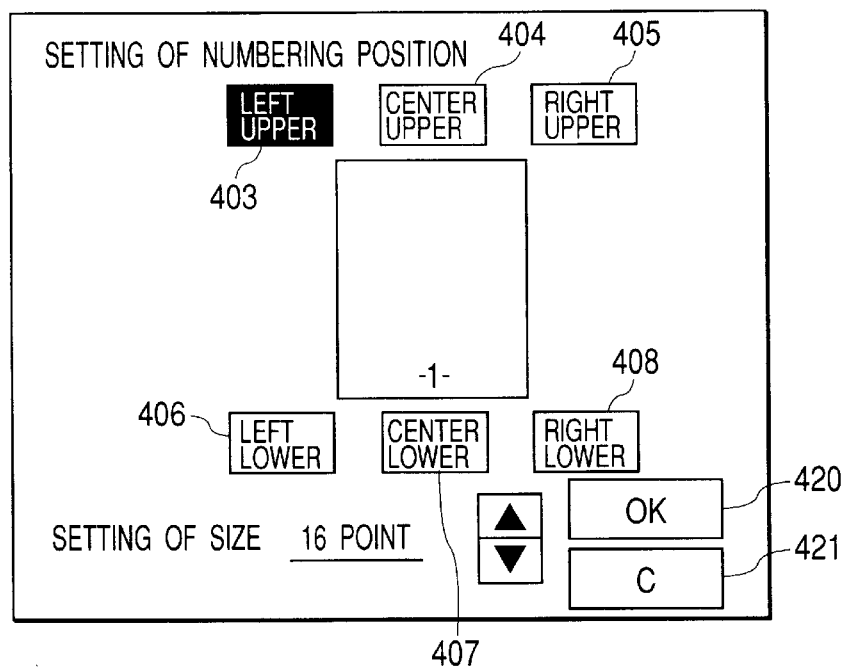
FIGS. 25A and 25B are diagrams showing display examples of the operating unit 123 upon setting of the numbering and finishing according to the second embodiment.
Figure 25B:
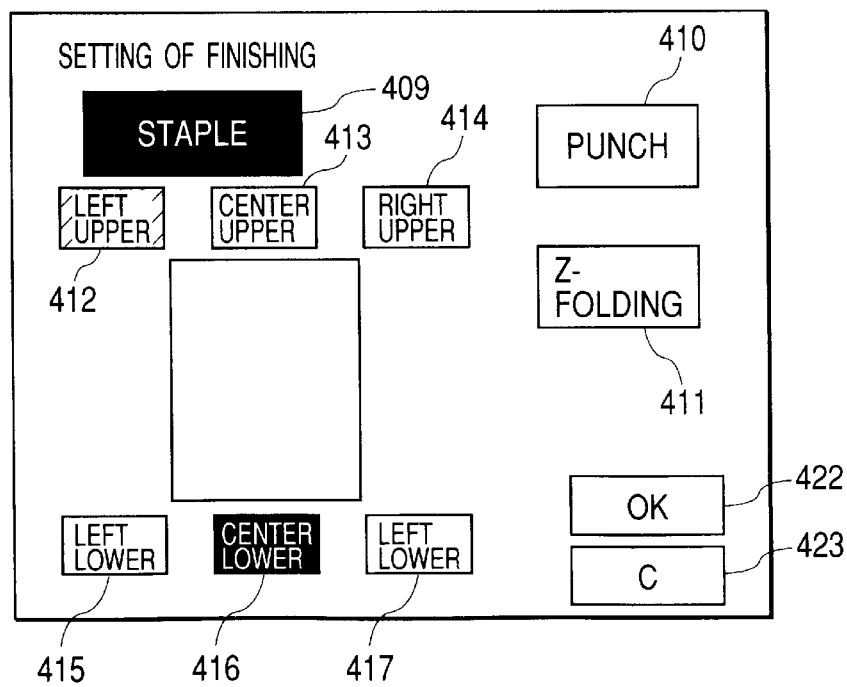

FIG. 23 is a flowchart showing the position adjusting operation upon setting of the numbering and the finishing according to the second embodiment of the invention. FIG. 24 is a diagram showing a display example of the operating unit 123 upon setting of the numbering and the finishing according to the second embodiment. FIGS. 25A and 25B are diagrams showing display examples of the operating unit 123 upon setting of details of the numbering and the finishing according to the second embodiment. A hardware construction and functional operations in the second embodiment are substantially the same as the hardware construction described in FIGS. 1 to 5 and the functional operations described in FIG. 6 to in the foregoing first embodiment.

When the application mode key 340 is pressed in the operating unit 123, a picture plane shown in FIG. 24 is displayed. A numbering set key 401 and a finishing set key 402 are displayed. If nothing is set in particular when the numbering set key 401 is pressed, a left upper numbering key shown at 403 has been selected. Similarly, if nothing is set in particular when the finishing set key 402 is pressed, a staple key 409 has been selected and a left upper staple key 412 has been selected.

When the numbering set key 401 is pressed, a picture plane shown in FIG. 25A is displayed. A printing position of the numbering is set by operating the displayed picture plane. Reference numerals 403, 404, 405, 406, 407, and 408 denote keys for designating the numbering positions and correspond to "left upper", "center upper", "right upper", "left lower", "center lower", and "right lower", respectively. In a state shown in FIG. 25A, "left upper" has been selected. In this state, the left upper numbering key 403 is inversely displayed, thereby showing that this key has been selected. An OK key 420 is pressed to decide the setting. A C key 421 is pressed to cancel the setting.

It is now assumed that "left upper" of the left upper numbering key 403 is selected and the OK key 420 is pressed to decide it (step S52). Thus, the state of "left upper" is stored as a numbering position (step S53). By pressing the OK key 420, the picture plane shown in FIG. 24 is displayed again. By pressing the finishing set key 402 here, a picture plane for setting the sheet post-process as shown in FIG. 25B is displayed (step S54).

In FIG. 25B, reference numerals 409, 410, and 411 denote a staple key, a punch key, and a Z-folding key, respectively. By pressing those keys, the stapling, punching, or Z-folding process corresponding to the pressed key can be set (steps S55, S56, S57).

When the staple key 409 is pressed (step S55), whether the numbering position is not set or not is discriminated (step S58). Since the numbering position has been set to "left upper" at present, on this picture plane, the left upper staple key 412 is displayed in gray, thereby informing the user of the fact that the left upper position cannot be set. Therefore, a position other than "left upper", for example, a center upper key 416 is selected and displayed (step S59). By pressing an OK key 422 here, the positions can be set so that the numbering position and the stapling position do not overlap with each other.

Also in case of setting the modes in order of the finishing setting and the numbering position setting, a key of the position which cannot be designated because the finishing mode has been set can be also displayed in gray on the numbering position setting picture plane.

Subsequently, a case where the punching mode and the Z-folding mode have been selected in FIG. 25B will be described.

With respect to the punching/Z-folding functions, although the punch key 410 and Z-folding key 411 serving as function designating keys have been displayed on the display picture plane of FIG. 25B, since there is no key display about the position designation, the position cannot be designated. That is, the punching function is validated only when punching holes are formed on the left side of the recording paper by the punching unit 250, and the Z-folding function is validated only when the right side of the large-sized paper is folded by the Z-folding unit 260.

It is now assumed that "left upper" has been selected as a numbering position on the picture plane shown in FIG.

25A (steps S52, S53). In this case, if the punching mode is selected (step S56) as a setting of the sheet post-process (step S54), a situation that the punching position and the numbering position overlap with each other occurs (step S60).

Figure 26A:
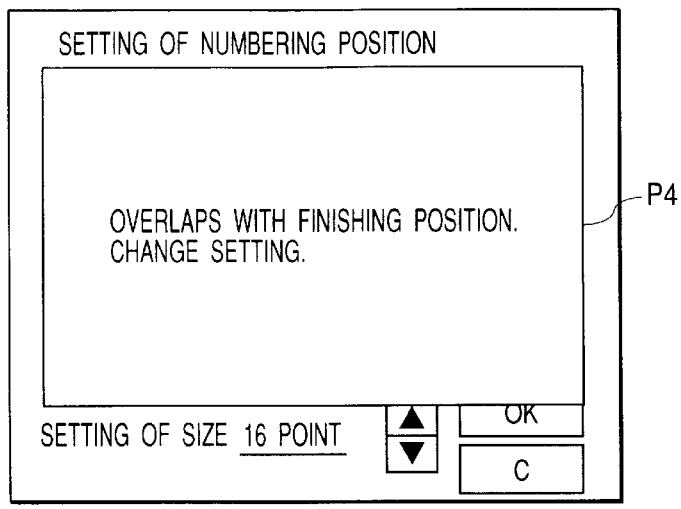
FIGS. 26A, 26B, and 26C are diagrams showing warning display examples of the operating unit upon setting of the numbering and finishing according to the second embodiment.
Figure 26B:
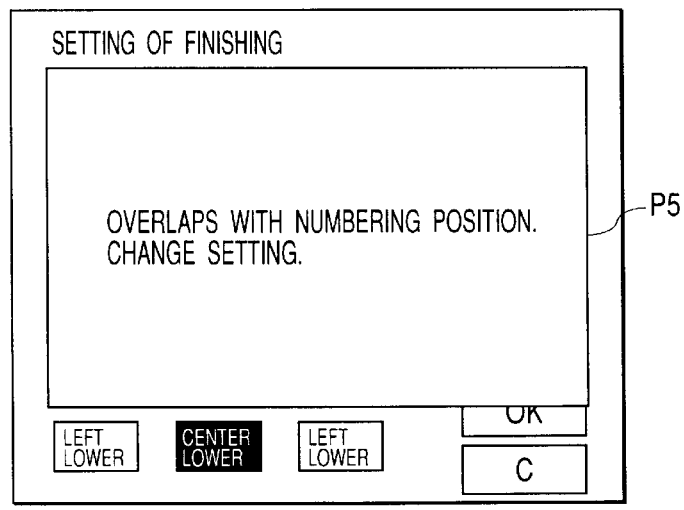
Figure 26C:
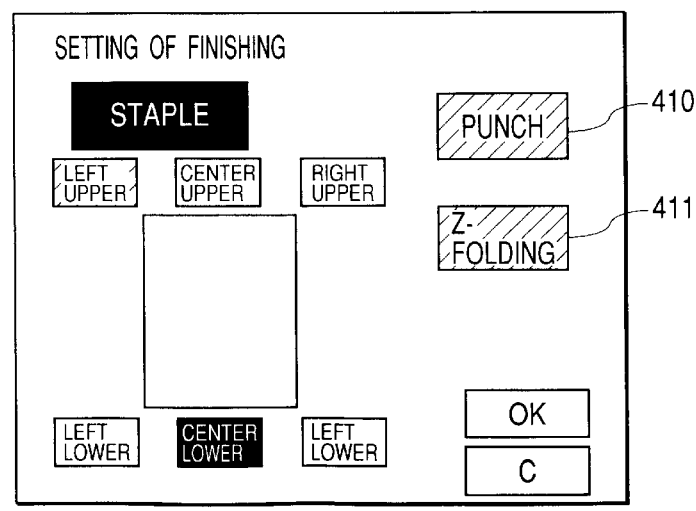

Therefore, if the user presses the punch key 410 and intends to decide the punching mode by pressing the OK key 422, a warning picture plane P4 shown in FIG. 26A is displayed (step S61). In case of setting the modes in opposite order, that is, in order of the finishing setting and the numbering position setting, a warning picture plane P5 shown in FIG. 26B is displayed. As shown in FIG. 26C, it is also possible to display the punch key 410 and Z-folding key 411 in gray and notify the user of the fact that those modes cannot be selected.

Third Embodiment

In the third embodiment, a case where an original direction detecting function is used with respect to the adjusting operation of the printing position of the character data in the numbering function or the like and the sheet post-processing position will be described.

Figure 27:
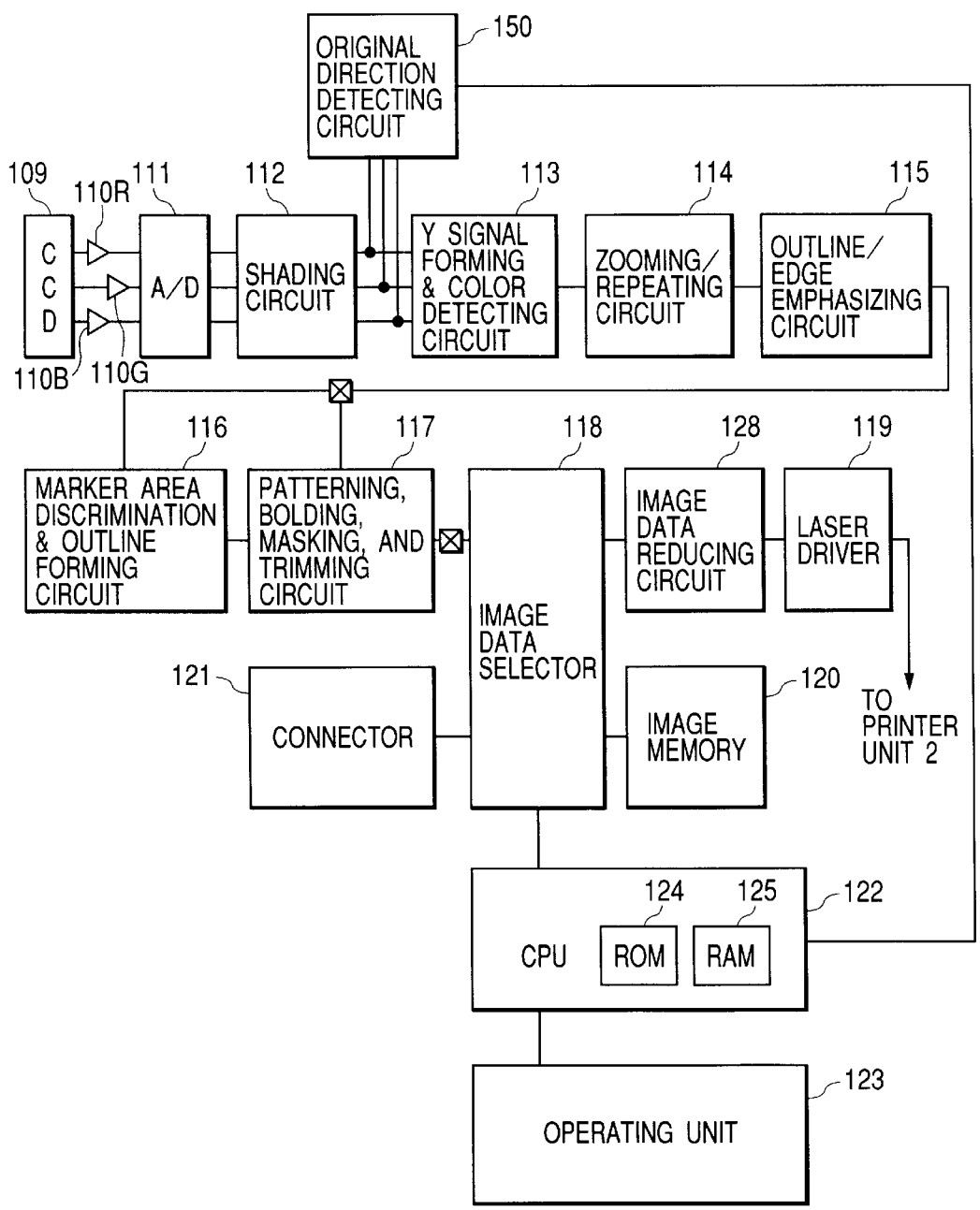
FIG. 27 is a circuit block diagram showing a signal process construction of the reader unit 1 according to the third embodiment.

FIG. 27 is a circuit block diagram showing a signal process construction of the reader unit 1 according to the third embodiment of the invention, and component elements which are common to those in FIG. 2 are designated by the same reference numerals and their descriptions are omitted here.

The reader unit 1 in the third embodiment is obtained by providing the original direction detecting circuit 150 for the construction of FIG. 2. By using the original direction detecting circuit 150, the original direction detecting function in the embodiment is realized. A hardware construction and functional operations of the third embodiment are substantially the same as the hardware construction described in FIGS. 1 to 5 and the functional operations described in FIGS. 6 to 10 in the foregoing first embodiment.

In the third embodiment, a case where the top side of the original is determined to be "left" by the original direction detecting function, the stapling position has been set to "left upper", and the numbering position has been set to "left upper" will be described.

Figure 11:
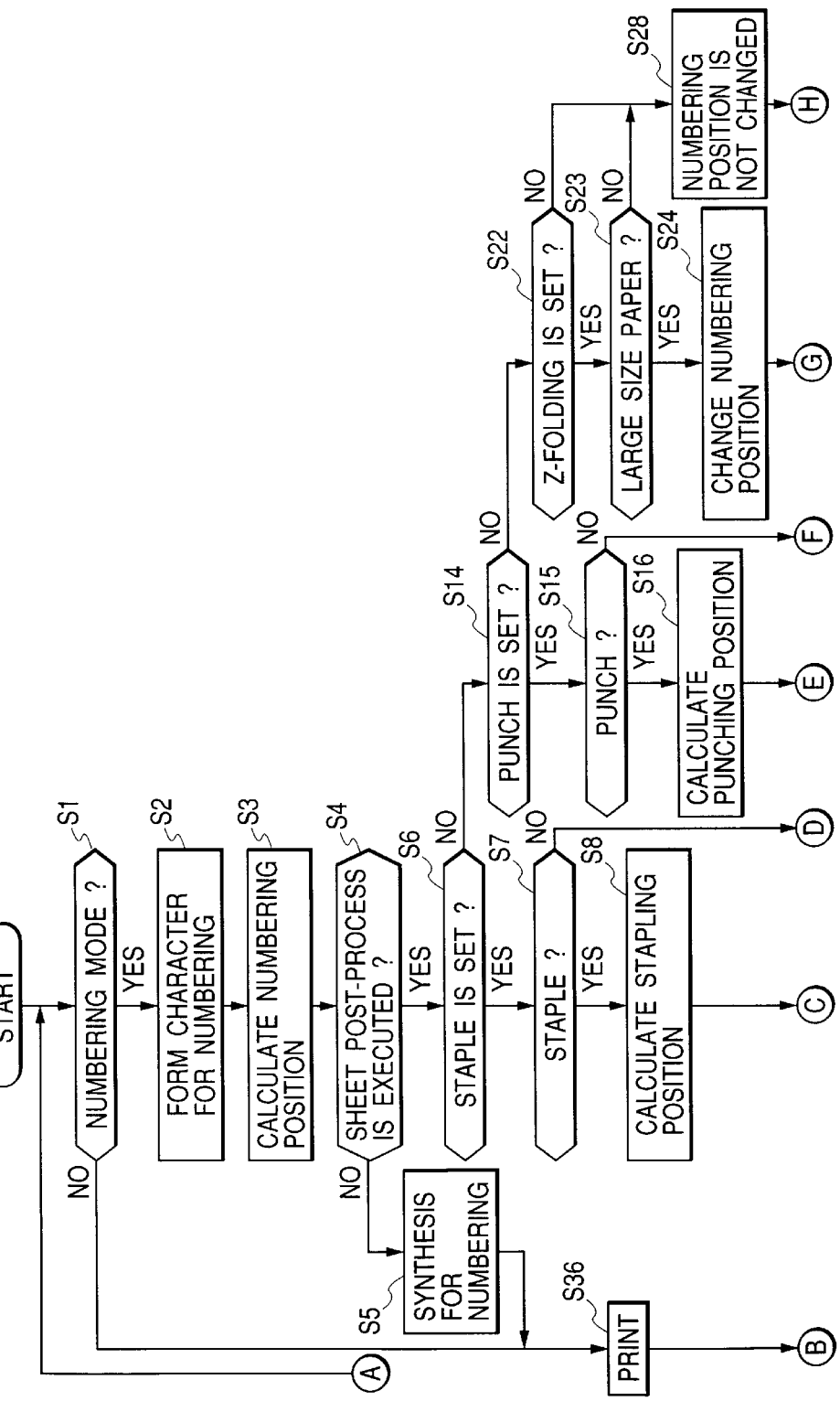
FIG. 11 is a flowchart showing a case of changing a character position according to the first embodiment.
Figure 12:
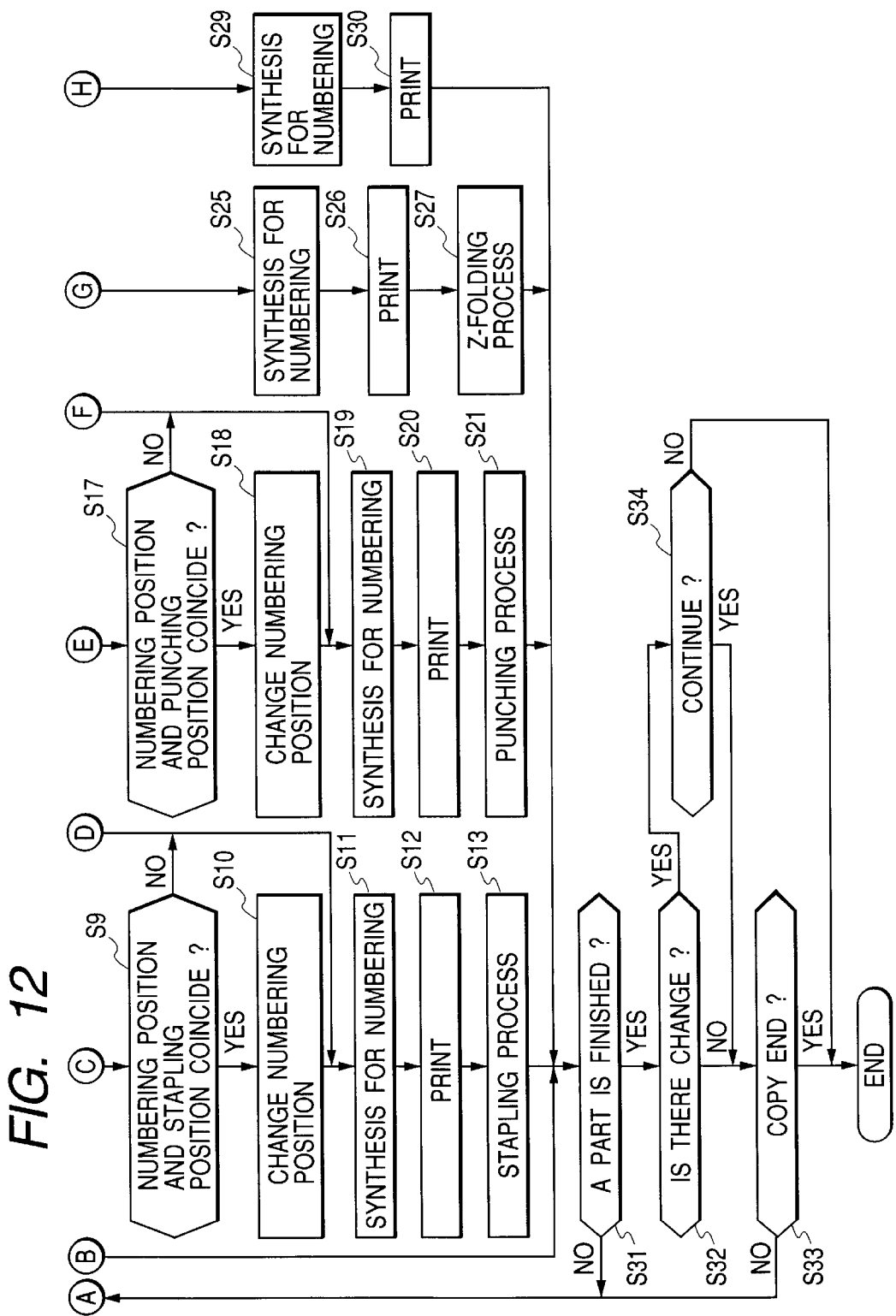
FIG. 12 is a flowchart which is a sequel to FIG. 11.

When three originals of the A4 size are stacked onto the document feeder 101 and three copies are printed onto the recording paper of the A4 size, first, whether the numbering process is performed or not is discriminated (step S1 in FIG. 11). In order to perform the numbering process, character data for numbering is formed (step S2) and the numbering position is discriminated (step S3).

Figure 28:
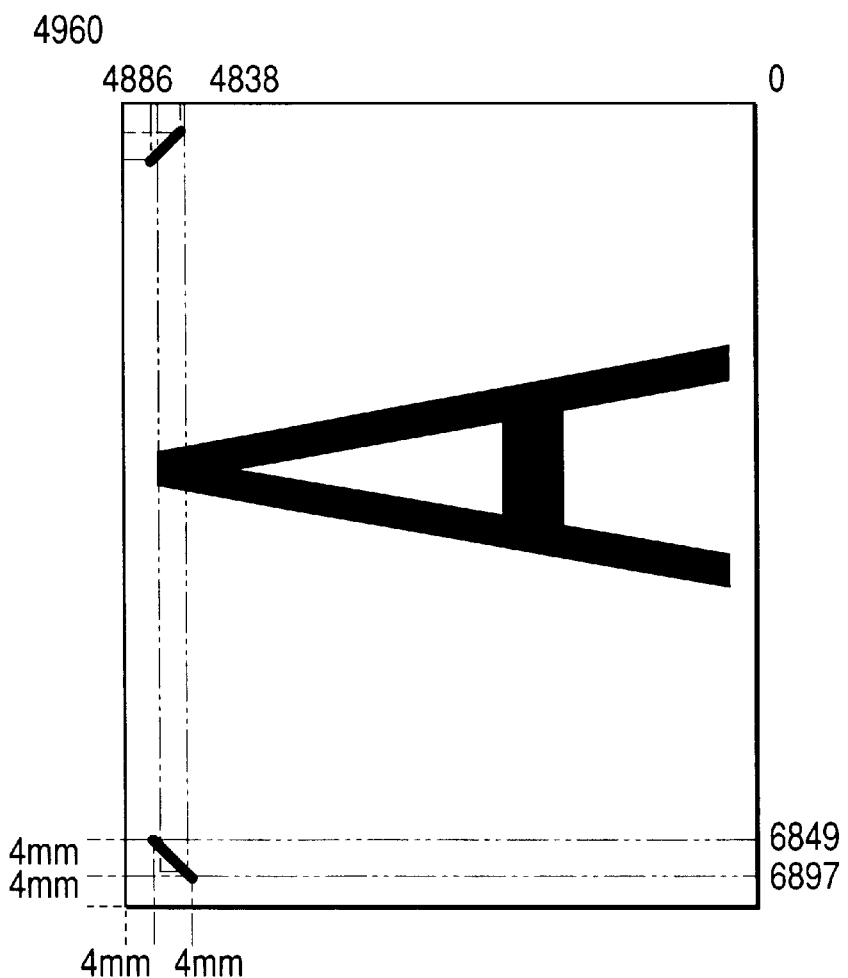
FIG. 28 is a diagram showing a case (top side is left) where character synthesis and a sheet post-process (stapling) are combined according to the third embodiment.

Since the "left upper" numbering position is predetermined to a position of 5 mm/5 mm from the paper edge shown in FIG. 28, if the top side is set to the left side, this position corresponds to a position defined by addresses (4838, 6849), (4886, 6849), (4838, 6897), and (4886, 6897). In order to staple (step S7), the stapling position is discriminated (step S8).

If the stapling position is set to "left upper", since the top side of the original is set to the left side, the stapling is performed at a position of 4 mm/4 mm/4 mm/4 mm shown in FIG. 28. This position corresponds to a position defined by addresses (4886, 6827), (4772, 6827), (4886, 6921), and (4772, 6921) (step S8). When the stapling position and the numbering position are compared, since they coincide (step S9 in FIG. 12), the numbering position is changed and the stapling is performed at the "right upper" position (step S10).

As mentioned above, if the direction of the original is detected by using the original direction detecting function, the numbering position and the stapling position are automatically changed. In association with it, the adjusting operation of the numbering position and the stapling position is also similarly executed.

The above control method can be realized by storing programs according to the flowcharts of FIGS. 11, 12, 16, and 23 mentioned above into, for example, the ROM 124 in the CPU 122 and making them operative.

The invention is not limited to the apparatuses of the embodiments mentioned above, but can be applied to a system constructed by a plurality of apparatuses or an apparatus comprising one equipment. The invention is also accomplished by a method whereby a memory medium in which program codes of software to realize the functions of the embodiments mentioned above have been stored is supplied to a system or an apparatus and a computer (or a CPU or an MPU) of the system or apparatus reads out and executes the program codes stored in the memory medium.

In this case, the program codes themselves read out from the memory medium realize the functions of the embodiments mentioned above. The memory medium in which the program codes have been stored constructs the invention. As a memory medium for supplying the program codes, for example, a floppy disk, a hard disk, an optical disk, a magnetooptic disk, a CD-ROM, a CD-R, a magnetic tape, a non-volatile memory card, or an ROM can be used. Naturally, the invention incorporates not only a case where a computer executes the read-out program codes, so that the functions of the embodiments mentioned above are realized but also a case where on the basis of instructions of the program codes, an OS or the like which is operating on the computer executes a part or all of the actual processes, and the functions of the embodiments mentioned above are realized by the processes.

Further, naturally, the invention also incorporates a case where the program codes read out from the memory medium are written into a memory provided for a function expanding board inserted into a computer or a function expanding unit connected to a computer, thereafter, on the basis of instructions of the next program codes, a CPU or the like provided for the function expanding board or function expanding unit executes a part or all of the actual processes and the functions of the embodiments mentioned above are realized by the processes.

As described in detail above, according to the invention, even in the case where a combination of the function for synthesizing the character data such as a numbering function or the like and the sheet post-process are executed, the positions can be adjusted so that both positions do not overlap with each other. Thus, the printed paper can be outputted optimally and it is unnecessary for the user to wastefully output the printed paper.

What is claimed is:

1. An image forming apparatus comprising:

character data forming means for forming character data;

synthesizing means for synthesizing the character data formed by said character data forming means with image data;

image output means for printing a synthesis result of said synthesizing means onto a sheet;

sheet post-processing means for performing a post-process to the sheet outputted by said image output means; and adjusting means for adjusting a printing position of said character data and a processing position of said sheet post-processing means.

2. An apparatus according to claim 1, wherein when the printing position of said character data and the processing position of said sheet post-processing means are the same position, said adjusting means changes the printing position of said character data.

3. An apparatus according to claim 1, wherein when the printing position of said character data and the processing position of said sheet post-processing means are the same position, said adjusting means changes the processing position of said sheet post-processing means.

4. An apparatus according to claim 1, further comprising means for outputting to confirm said character data and a result of the process of said sheet post-processing means.

5. An apparatus according to claim 1, further comprising image reading means for reading an original and converting it into image data, and wherein said synthesizing means synthesizes the image data formed by said image reading means with said character data.

6. An apparatus according to claim 5, further comprising original direction detecting means for discriminating a direction of said original, and wherein the printing position of the character image data and the sheet post-processing position are determined in accordance with the direction of the image detected by said original direction detecting means.

7. An apparatus according to claim 1, wherein said sheet post-processing means has:

stapling means for stapling;

punching means for punching; and/or folding means for folding the sheet into three parts.

8. An apparatus according to claim 7, wherein said stapling means can staple to at least a plurality of positions on the sheet and has an image rotating function for rotating the image in order to enable a stapling position to be varied.

9. An apparatus according to claim 7, wherein in case of folding the sheet by said folding means, said character data is printed onto a maximum one of surfaces obtained after the sheet was folded.

10. An apparatus according to claim 1, wherein said synthesizing means has a first mode of overwriting said character data and a second mode of OR-writing said character data in case of synthesizing said character data with said image data.

11. An image forming apparatus for synthesizing an additional image with image data, forming an image onto a sheet, and executing a post-process to said sheet, comprising:

first setting means for setting a position of said additional image on said sheet;

second setting means for setting a position on said sheet at which said post-process is executed; and control means for warning in the case where the position set by said first setting means and the position set by said second setting means overlap with each other.

12. An image forming apparatus for synthesizing an additional image with image data, forming an image onto a sheet, and executing a post-process to said sheet, comprising:

first display control means for displaying a first set picture plane for setting a position of said additional image on said sheet; and second display control means for displaying a second set picture plane for setting a position on said sheet at which said post-process is executed, wherein said first display control means displays the position of said additional image so that said position can be discriminated on said second set picture plane.

13. An image forming apparatus for synthesizing an additional image with image data, forming an image onto a sheet, and executing a post-process to said sheet, comprising:

first display control means for displaying a first set picture plane for setting a position of said additional image on said sheet; and second display control means for displaying a second set picture plane for setting a position on said sheet at which said post-process is executed, wherein said first display control means displays the position at which said post-process is executed so that said position can be discriminated on said first set picture plane.

14. An image forming method comprising:

a character data forming step of forming character data;

a synthesizing step of synthesizing the character data formed in said character data forming step with image data;

an image output step of printing a synthesis result in said synthesizing step onto a sheet;

a sheet post-processing step of performing a post-process to the sheet outputted by said image output step; and an adjusting step of adjusting a printing position of said character data and a processing position in said sheet post-processing step.

15. A method according to claim 14, wherein in said adjusting step, when the printing position of said character data and the processing position in said sheet post-processing step are the same position, the printing position of said character data is changed.

16. A method according to claim 14, wherein in said adjusting step, when the printing position of said character data and the processing position in said sheet post-processing step are the same position, the processing position in said sheet post-processing step is changed.

17. A method according to claim 14, further comprising a step of outputting to confirm said character data and a result of the process in said sheet post-processing step.

18. A method according to claim 14, further comprising an image reading step of reading an original and converting it into image data, and wherein in said synthesizing step, the image data formed by said image reading step and said character data are synthesized.

19. A method according to claim 18, further comprising an original direction detecting step of discriminating a direction of said original, and wherein the printing position of the character image data and the sheet post-processing position are determined in accordance with the direction of the image detected in said original direction detecting step.

20. A method according to claim 14, wherein said sheet post-processing step has:

a stapling step of stapling;

a punching step of punching; and/or a folding step of folding the sheet into three parts.

21. A method according to claim 20, wherein in said stapling step, it is possible to staple to at least a plurality of positions on the sheet, and said stapling step has an image rotating function for rotating the image in order to enable a stapling position to be varied.

22. A method according to claim 20, wherein in case of folding the sheet by said folding step, said character data is printed onto a maximum one of surfaces obtained after the sheet was folded.

23. A method according to claim 14, wherein said synthesizing step has a first mode of overwriting said character data and a second mode of OR-writing said character data in case of synthesizing said character data with said image data.

24. An image forming method of synthesizing an additional image with image data, forming an image onto a sheet, and executing a post-process to said sheet, comprising:
a first setting step of setting a position of said additional image on said sheet;
a second setting step of setting a position on said sheet at which said post-process is executed; and
a control step of warning in the case where the position set by said first setting step and the position set by said second setting step overlap with each other.

25. An image forming method of synthesizing an additional image with image data, forming an image onto a sheet, and executing a post-process to said sheet, comprising the steps of:
providing first display control means for displaying a first set picture plane for setting a position of said additional image on said sheet and second display control means for displaying a second set picture plane for setting a position on said sheet at which said post-process is executed; and
displaying the position of said additional image so that said position can be discriminated on said second set picture plane.

26. An image forming method of synthesizing an additional image with image data, forming an image onto a sheet, and executing a post-process to said sheet, comprising the steps of:
providing first display control means for displaying a first set picture plane for setting a position of said additional image on said sheet and second display control means for displaying a second set picture plane for setting a position on said sheet at which said post-process is executed; and
displaying the position at which said post-process is executed so that said position can be discriminated on said first set picture plane.

27. A medium which provides a control program, wherein said program comprises:
a character data forming step of forming character data;
a synthesizing step of synthesizing the character data formed in said character data forming step with image data;
an image output step of printing a synthesis result in said synthesizing step onto a sheet;
a sheet post-processing step of performing a post-process to the sheet outputted by said image output step; and
an adjusting step of adjusting a printing position of said character data and a processing position in said sheet post-processing step.

28. A medium which provides a control program for executing an image forming method of synthesizing an additional image with image data, forming an image onto a sheet, and executing a post-process to said sheet, wherein said program comprises:
a first setting step of setting a position of said additional image on said sheet;
a second setting step of setting a position on said sheet at which said post-process is executed; and
a control step of warning in the case where the position set by said first setting step and the position set by said second setting step overlap with each other.

29. A medium which provides a control program for executing an image forming method of synthesizing an additional image with image data, forming an image onto a sheet, and executing a post-process to said sheet, wherein said program comprises:
a first display control step of displaying a first set picture plane for setting a position of said additional image on said sheet; and
a second display control step of displaying a second set picture plane for setting a position on said sheet at which said post-process is executed,
wherein in said first display control step, the position of said additional image is displayed so that said position can be discriminated on said second set picture plane.

30. A medium which provides a control program for executing an image forming method of synthesizing an additional image with image data, forming an image onto a sheet, and executing a post-process to said sheet, wherein said program comprises:
a first display control step of displaying a first set picture plane for setting a position of said additional image on said sheet; and
a second display control step of displaying a second set picture plane for setting a position on said sheet at which said post-process is executed,
wherein in said first display control step, the position at which said post-process is executed is displayed so that said position can be discriminated on said first set picture plane.

31. A control program comprising:
a character data forming step of forming character data;
a synthesizing step of synthesizing the character data formed in said character data forming step with image data;
an image output step of printing a synthesis result in said synthesizing step onto a sheet;
a sheet post-processing step of performing a post-process to the sheet outputted by said image output step; and
an adjusting step of adjusting a printing position of said character data and a processing position in said sheet post-processing step.

32. A control program for executing an image forming method of synthesizing an additional image with image data, forming an image onto a sheet, and executing a post-process to said sheet, comprising:
a first setting step of setting a position of said additional image on said sheet;
a second setting step of setting a position on said sheet at which said post-process is executed; and
a control step of warning in the case where the position set by said first setting step and the position set by said second setting step overlap with each other.

33. A control program for executing an image forming method of synthesizing an additional image with image data, forming an image onto a sheet, and executing a post-process to said sheet, comprising:
a first display control step of displaying a first set picture plane for setting a position of said additional image on said sheet; and
a second display control step of displaying a second set picture plane for setting a position on said sheet at which said post-process is executed, wherein in said first display control step, the position of said additional image is displayed so that said position can be discriminated on said second set picture plane.

34. A control program for executing an image forming method of synthesizing an additional image with image data, forming an image onto a sheet, and executing a post-process to said sheet, comprising:

a first display control step of displaying a first set picture plane for setting a position of said additional image on said sheet; and a second display control step of displaying a second set picture plane for setting a position on said sheet at which said post-process is executed, wherein in said first display control step, the position at which said post-process is executed is displayed so that said position can be discriminated on said first set picture plane.

* * * * *

UNITED STATES PATENT AND TRADEMARK OFFICE
CERTIFICATE OF CORRECTION

PATENT NO. : 6,704,527 B2
DATED : March 9, 2004
INVENTOR(S) : Hidehiko Asai

It is certified that error appears in the above-identified patent and that said Letters Patent is hereby corrected as shown below:

Column 12,
Line 2, "FIG. 6 to" should read -- FIGS. 6 to 10 --.

Signed and Sealed this

Tenth Day of August, 2004

JON W. DUDAS
*Acting Director of the United States Patent and Trademark Office*